United States Patent [19]
Lyons et al.

[11] Patent Number: 5,189,608
[45] Date of Patent: * Feb. 23, 1993

[54] METHOD AND APPARATUS FOR STORING AND GENERATING FINANCIAL INFORMATION EMPLOYING USER SPECIFIED INPUT AND OUTPUT FORMATS

[75] Inventors: Richard J. Lyons, West Hempstead; Kevin F. Nolan, Middle Village, both of N.Y.; Wah C. Chu, Fairfield, Conn.

[73] Assignee: IMRS Operations, Inc., Stamford, Conn.

[*] Notice: The portion of the term of this patent subsequent to Jan. 29, 2008 has been disclaimed.

[21] Appl. No.: 480,701

[22] Filed: Feb. 15, 1990

Related U.S. Application Data
[63] Continuation of Ser. No. 55,823, Jun. 1, 1987, Pat. No. 4,989,141.

[51] Int. Cl.⁵ .............................................. G06F 15/21
[52] U.S. Cl. .................................... 364/408; 364/401
[58] Field of Search ................ 364/400, 401, 408; 11/11; 395/148

[56] References Cited
U.S. PATENT DOCUMENTS
4,321,672 3/1982 Braun et al. ..................... 364/408

OTHER PUBLICATIONS
"Using Spreadsheets to Monitor Your Portfolio", Thomas A. Meyers PC Magazine, Apr. 1986.
Dow Jones Software, Product Brochure, Spreadsheet Analysis.
Teddi Converse, *Reflex In Business*, pp. 204-217 1988.
Doyle, William J., "Using SuperCal: The Next Generation" pp. 179, 292-315.
"Leading Edge: Nord Processing", pp. Appendix B.
"Using 1-2-3", pp. 182-193.

*Primary Examiner*—Gail O. Hayes
*Attorney, Agent, or Firm*—Pennie & Edmonds

[57] ABSTRACT

An advanced financial reporting and analysis software package is described. The package collects, organizes, manages and consolidates financial data and provides user defined capabilities for creating financial and corporate reports. Financial data is organized into four business classifications or dimensions: Schedule, Entity, Period and Type. Data is stored in the system in such a way that all data associated with a particular Schedule, Entity, Period and Type is identified by that particular SEPT value. To accommodate automatic data entry, a mapping means or template is provided that specifies for each different input spreadsheet the location of the first data cell in the spreadsheet and the size of the spreadsheet. Data is read from the data store by various report and spreadsheet generating functions which convert data associated with particular SEPT values to desired output formats.

9 Claims, 29 Drawing Sheets

METHOD AND APPARATUS FOR STORING AND GENERATING FINANCIAL INFORMATION EMPLOYING USER SPECIFIED INPUT AND OUTPUT FORMATS

This is a continuation of application Ser. No. 07/055,823 filed Jun. 1, 1987, now U.S. Pat. No. 4,989,541.

BACKGROUND OF THE INVENTION

This relates generally to computer systems and more particularly to a computer software method and apparatus for advanced financial applications such as general ledger, inventory, accounts payable, accounts receivable, financial and management reporting, and financial analysis and consolidation.

Corporate software systems generally are divided into two categories. The first, basic financial systems, includes general ledger, accounts receivable and accounts payable systems. These systems include computer worksheets and data bases. The second, advanced financial systems and processes, uses information from the basic financial systems to perform financial analysis and reporting functions.

At present many of the basic financial systems applications reside on micro computer software packages.

Worksheet applications allow the user to keep a two dimensional chart of his financial data on an electronic worksheet. Illustrative of such spread sheet applications is Lotus Development Corporation's LOTUS 1-2-3 ®. That program allows the user to set up two dimensional worksheets in the form of a grid made up of horizontal rows and vertical columns. Each intersection of a row or column forms a cell in which data can be stored in the form of numeric data (such as an account balance), text (such as an account name), or arithmetic operators (such as a formula which manipulates the contents of other cells). To enter data into a worksheet, the user will usually enter data via a keyboard, cell by cell. When users employ LOTUS 1-2-3 ® to perform more detailed analyses it is likely that they have also created complicated strings of commands (i.e., macros) to facilitate data entry, management and reporting capabilities. Since these macros have been created by specific individuals, they can be difficult to revise should business dictate. More important, because these macros are tailored to a user's personal needs, the application's usefulness across the corporation is limited.

These spreadsheet programs are also limited by their presentation of data in only two dimensions. This often requires considerable reorganization of the data before it can be used in advanced financial systems.

Database packages such as Ashton Tate's dBASE III ® allow the user to keep a financial data base. Frequently, this information is needed for use in a report having a format different from that in which it is stored or in a spreadsheet such as that generated by one of the computer spreadsheets. However, report generation can be tedious and a great deal of data manipulation must be performed in order to load data from a data base into an electronic worksheet. For example, to load data from a data base to an electronic spreadsheet, the user must convert the data into an ASCII file and subsequently download it into an electronic worksheet. When data is downloaded into a worksheet each field must be inserted into a cell. The downloading of data into the worksheet must be done with extreme care, otherwise cells containing formulas may be overwritten.

In addition to the above limitations, personal computer programs also generally lack the capacity to implement complex information management and finance controls such as audit trails and password protection capabilities needed in high-level financial applications.

These programs also have the limitations that they are typing intensive with the result that the user must either acquire reasonable typing skills in order to use such programs efficiently or he must suffer considerable time penalties as he attempts to cope with extensive keyboard input.

SUMMARY OF THE INVENTION

The present invention is an advanced financial reporting and analysis software package. The package collects, organizes, manages and consolidates financial data and provides user defined capabilities for creating financial and corporate reports.

Data can be loaded into the computer system manually as well as from known micro-computer packages such as LOTUS 1-2-3 ® and Ashton-Tate's dBase ® and also from departmental and corporate data bases and basic financial systems such as general ledger, accounts payable and inventory applications. The software package can also incorporate data from outside sources, such as Dow Jones News/Retrieval service to permit analysis of competitive financial data.

Data is output from the financial data base of the present invention either into reports or directly into electronic worksheets. The data can be displayed in various ways allowing the user to use the system as an analysis tool as well as a production reporting system. The process of loading data base information into an electronic worksheet is far simpler than the method which must be employed when working with two separate conventional packages.

In accordance with the invention, financial data is organized into four business classifications or dimensions: Schedule, Entity, Period and Type. Schedule identifies the kind of document the data comes from (e.g., an income statement, a tax schedule). Entity identifies the reporting group within the business organization (e.g., departments, divisions, subsidiaries). Period identifies the range of time that the data represents (e.g., FY 87, Q2 87). Type provides an additional dimension that can be used to further categorize the data (e.g., actual, budget, forecast).

Data is stored in the system in such a way that all data associated with a particular Schedule, Entity, Period and Type (SEPT) is identified by that particular SEPT value and is stored in a predetermined pattern relative to the location of that SEPT value in the data store.

To accommodate automatic data entry, a mapping means or template is provided that specifies for each different input spreadsheet the location of the first data cell in the spreadsheet and the size of the spreadsheet. From this information, the system is able to locate the data in the spreadsheet and read it systematically into the data store.

Data is read from the data store by various report and spreadsheet generating functions which convert data associated with particular SEPT values to desired output formats. For example, one such function might map data associated with the same Schedule, Entity and Type but consecutive Periods over several years onto a spreadsheet having as many columns as there are Periods so as to produce a spreadsheet showing the variation of such data over time.

One function of the present invention is to consolidate information that arrives at corporation's headquarters in multiple formats from the corporation's numerous divisions and subsidiaries. Through user-controlled dictionaries within its user interface, the computer application standardizes the way financial information is managed and analyzed within a corporation. In addition, the system allows for hierarchical mapping so that subsidiaries are attached to the controlling entities. Therefore, when data is input into the data base so as to update an entry, all entities which are attached to the updated entity are also updated.

Other features of the invention include a modeling function which is integrated with the data store so that data associated with any SEPT value can be recalled for use in calculating the model or for comparison with the model.

In addition to financial and management reporting and analysis, other application areas include international planning and analysis, consolidation and tax analysis and the like. Reporting functions include currency conversion, journal entries, hierarchy roll-ups and computation of year to date totals and variances. Additional features include audit trails and data verification.

The present invention may be used as a stand alone system, but is preferably for departmental use. The financial computer system and process is designed for use by all levels of employees who are involved in financial control, whether it be a firm's chief financial officer or an end user in the financial department.

The financial system of the present invention is presently sold commercially by the assignee as the FAS-TAR ™ financial computer program. Further details of the operation of the system are set forth in the FAS-TAR ™ Tutorial, Reference Guide, Quick Reference, Modeling Guide, and Modeling Quick Reference available from the assignee, which are incorporated here by reference.

BRIEF DESCRIPTION OF DRAWINGS

These and other objects, features and advantages of the invention will be more readily apparent from the following description of a preferred embodiment of the invention in which.

DETAILED DESCRIPTION OF PREFERRED EMBODIMENT

Figure 1:
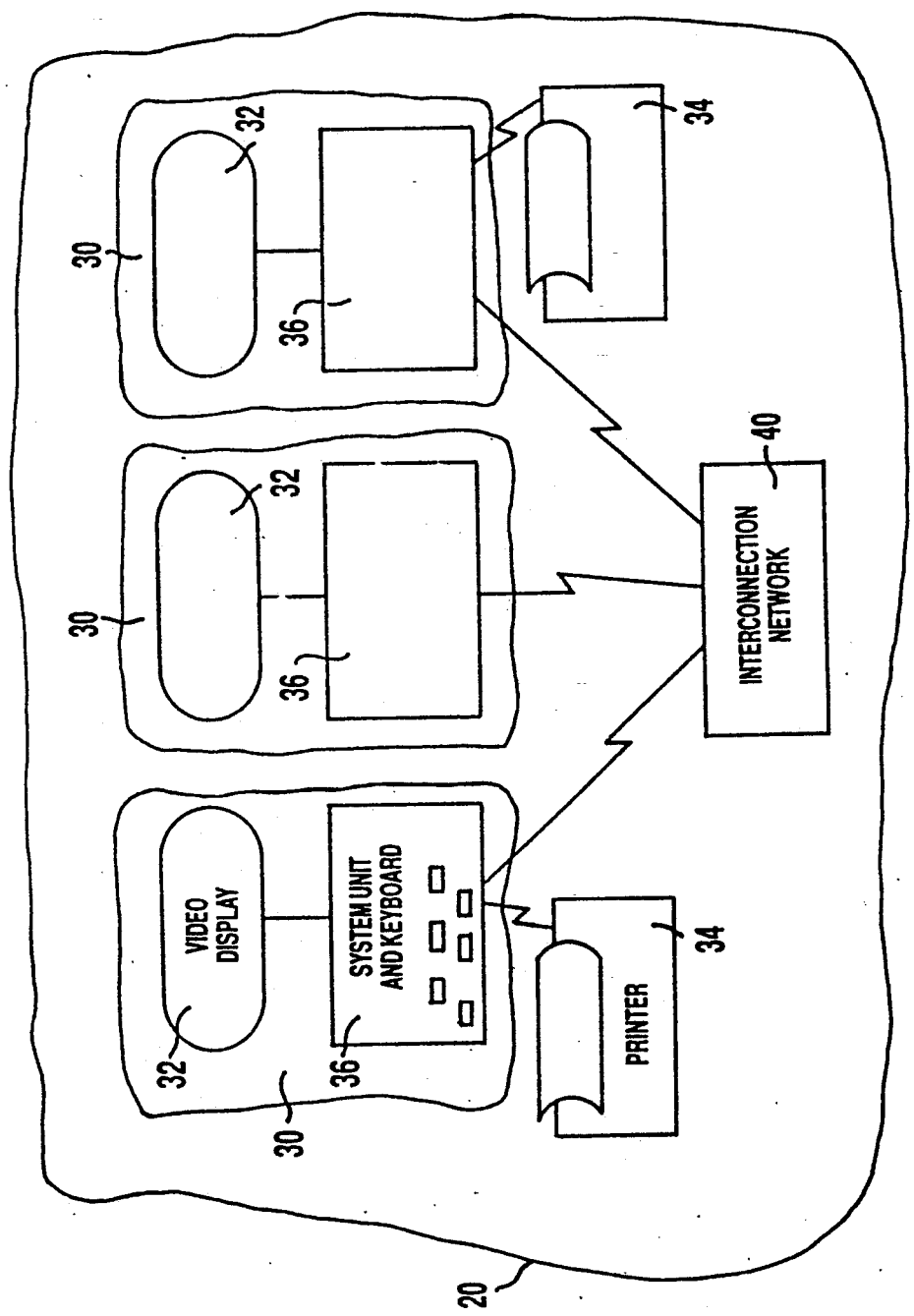
FIG. 1 is a system overview of an illustrative computer system used in the practice of the invention.

As shown in FIG. 1, the preferred embodiment of the invention is a computer system 20 illustratively comprising a plurality of personal computers 30 and an interconnection network 40. The system can be networked to twenty-five users or more. Resident in the memory of one of the computers 30 and accessible to all of them is the data base management program of the present invention which provides for advanced query and analysis functions.

The personal computers illustratively are IBM-PC's or clones or any of the more advanced personal computers now available. As is well known such computers include a processor, a read/write memory and means for writing data into said memory and reading data from said memory. Typical memory configurations used with the present invention should include at least 640 Kilobytes of semiconductor random access memory and at least a 10 megabyte hard disk. Each such computer includes a video display 32, a printer 34, and a keyboard 36 that provides for alphanumeric input, function keys and a cursor control. Data can be input from the keyboard or from computer files such as electronic worksheets. Data can be output to printed reports and to electronic worksheets.

Unlike conventional data base management systems or worksheet applications, the system of the present invention allows for a four dimensional analysis of all financial data. In particular, the data stored in the system is organized into four business classifications or dimensions, namely Schedule, Entity, Period and Type (SEPT). Schedule identifies the type of document that the data comes from (e.g., income statements, budgets, tax schedules) Entity identifies a reporting group within the organization (e.g., departments, subsidiaries). Period identifies the time that the data represents (e.g., FY 87, Q2 87). Type provides an additional dimension that allows the user to further categorize data (e.g., actual, budgeted, forecast).

In storage, all the data associated with a particular Schedule, Entity, Period and Type is identified by that particular SEPT value. Thus, the system data base can be represented as follows:

$S_1, E_1, P_1, T_1,$ datacell$_1, \ldots$ datacell$_x$ $S_k, E_l, P_m, T_n,$ datacell$_1, \ldots$ datacell$_y$ where the number of SEPT values can be as great as the product of the numbers of Schedules, Entities, Periods and Types (i.e., k*l*m*n) and the number of data cells associated with each SEPT value can vary.

In addition to the data base, the system of the present invention also provides a means of mapping input data from its source to the location in the database assigned to the particular SEPT value with which it is associated and means for mapping data from the database location assigned to the SEPT values to an output format. The input mapping means is referred to below as an input template Several output mapping means are described below for the generation of output reports or files.

When retrieving data from the system, the user can specify data from different categories in each of the dimensions. For example, the user may have defined a data base with the following SEPT entries:

| SCHEDULES | ENTITIES | PERIODS | TYPES |
|---|---|---|---|
| Income statement | Corporate | Q1 87 | Actual |
| Balance Sheet | U.S. | Q2 87 | Budgeted |
| Sales Budget | Far East | Q3 87 | Forecast |
| Tax Schedule | Europe | Q4 87 | Q4 Var |

The user could then retrieve data on the basis of any combination of the categories found in each of the four dimensions. For example, the user could request:

Schedule = Sales Budget

Entity = U.S., Far East

Period = Q1 87

Types = Actual, Budgeted.

Or he could request:

Schedule = Income Statement

Entity = Corporate

Period = Q1 87, Q2 87

Type = Forecast.

This allows the user to work in a manner in which he is accustomed. Although most financial analysts manually analyze data by using this four dimensional approach, no known other computer system allows for this "SEPT" method.

The General Flow of Operation of the Data Base Management System

The user enters the data base management system by typing the name of the system. As illustrated in Table I, a screen will appear which will provide (1) the date the user entered the system, (2) a copyright notice; (3) a menu of available operations, (4) a work area, (5) the system status, (6) an indication from which data base the computer system is reading, (7) the default drive, (8) the SEPT selections and (9) the amount of available memory. The last line (10) is a prompt line which describes the purpose of a highlighted menu or sub-menu item.

The operations set forth in the main menu of Table I are as follows.

The CREATE function allows the user to build templates, define and modify schedules, hierarchies, dictionaries, ranges, and certain system defaults.

The INPUT function allows the user to input data into a data base from electronic worksheets, computer files or a keyboard.

The QUERY function allows the user to extract information and create a report or a worksheet with the requested information.

The ANALYZE function allows the user to modify an existing query without redefining the entire query.

The REPORT function reformats a previously run query or model into print pages for viewing or printing. This function also allows the user to design custom reports by extracting data from the data base.

The TRANSFER function allows the user to transfer data from one data base to another, to a file or to a diskette. For example, the user may wish to transfer all of his sales data to a file to be used in another computer system.

MAINTAIN allows the user to perform various data base management tasks such as creating, copying or restoring a data base and password protection. The system uses seven levels of passwords to ensure tight security. The levels of priority are:
1. System Administration
2. Management Control
3. Dictionary Maintenance
4. Data Transfer/Purge
5. Input Entry
6. Input Data
7. Inquiry X-RUN allows the user to access other software packages without leaving the data base management system.

EXIT allows the user to log off. Two options are

TABLE I

| (1) May 20, 1987 | (2) copyright © 1986 | Corp. Class Software | | | (5) NUM CAP | READY |
|---|---|---|---|---|---|---|
| (3) <u>CREATE</u> INPUT | QUERY | ANALYZE | REPORT | TRANSFER | MAINTAIN X-RUN | EXIT |
| | | (4) | | | | |
| (6) Database C: DEMO.DB | (7) Drive C | Schedule INCOME | (8) Entity ACME | Period JAN 87 | Type ACTUAL | (9) Memory 178696 |
| Create define and modify input schedule, hierarchies, dictionaries & ranges. (10) | | | | | | |

The menu of available operations (3) lists the main functions of the computer system and highlights that one of them which is then available to the user. In Table I the lines above and below CREATE identify the highlighted function and the prompt line 10 describes the purpose of this function. The user selects a function by advancing the highlighter to that function by means of the cursor keys and confirms this selection by depressing an appropriate function select key such as the ENTER key. The system will then display a window on the screen containing a menu of subfunctions of the selected function, the first of which will also be highlighted. The user can then select a subfunction by advancing the highlighter through the menu of subfunctions. Upon selection of a subfunction, the system will then display a menu of further subfunctions and so on.

available: QUIT and BACKUP. BACKUP permits the user to backup his data base before he logs off.

A "POP-UP" function is available throughout the operation of the system. This function is used to extract data and transfer it between files, validate syntax codes and view the contents of a specified data cell, schedule, range or dictionary.

The operation of the system of the present invention falls into three phases, namely set-up, production reporting and ad-hoc analysis. Each phase involves specific computer functions, but all functions are available for use even after set-up has been completed.

In the "set-up" phase, the user creates user passwords, enters data into system dictionaries, sets default periods and types, specifies printer configurations and configures the data base management system for input by creating input templates and defining hierarchies and ranges. This phase uses the CREATE and INPUT functions.

In the "production" phase, the user periodically inputs data into the computer system, converts and consolidates it as needed, and outputs the results to worksheets or reports for review and distribution. This phase uses the INPUT, QUERY, ANALYZE, REPORT, TRANSFER, MAINTAIN and X-RUN functions.

The "ad-hoc" analysis phase allows the user to review and create analytical models without the constraints of formal production reports. This phase uses the QUERY and ANALYZE functions.

The user interface for each of these phases is discussed in turn immediately hereafter. Following such discussion is a description of the implementation in software of the system of the present invention.

Set-Up

Before the data base management system can operate, it needs an "outline" of the user's financial organization. For example, it must know which subsidiaries send data, the currencies these subsidiaries use and the currency conversion rules. This information is supplied by six dictionaries. The data base management system also needs to know the relationship or hierarchical organization of the entities that constitute the financial organization.

Other features of the present invention include automatic data entry from input files or worksheets into the system's data base and checking for integrity errors. To accommodate this automatic data entry, a mapping means or template must be created that specifies for each different input worksheet, the location of the first data cell in the worksheet and the size of the worksheet. From this information, the system is able to locate the data in the worksheet and read it systematically into the data store.

These and other set-up procedures are accomplished by selection of the CREATE function on the screen depicted in Table I. As shown in Table II, the CREATE function has six subfunctions: INPUT_TEMPLATE, HIERARCHY, DICTIONARY, RANGE, X-INTEGRITY and SETUP and each of these subfunctions has available to it a menu of sub-subfunctions such as ADD, MODIFY, DELETE, LIST.

shown by a line above and below each of these functions.

The INPUT_TEMPLATE function allows the user to build templates which are used as structured gateways for inputting data. All data passes through one of these templates before being stored, in the data base.

The HIERARCHY function allows the user to define the structure of the corporation for financial analysis. A hierarchy entity is the entity into which a specified group of other entities, called detailed entities, can be consolidated. The HIERARCHY function defines the order in which data can be automatically rolled-up from detailed entities to hierarchial entities.

The dictionaries are defined by the DICTIONARY function. There are six dictionaries for Period, Type, Entity, Currency Rate Code, Currency Rate Type and Account Description. These dictionaries are the first thing to be defined in setting up a system; and since the other dictionary entries are all defined relative to a specific period, the first dictionary entry to be defined is a Period. The other dictionary values are then defined for that period as well. For each additional period that is defined in the period dictionary, the remaining dictionary values must again be defined. Since these values are often the same over many different periods, this can usually be done simply by allowing the system to copy such values over for each additional period.

The RANGE function permits the user to define the categories into which the data is organized in the system by providing a pointer between a name and a datacell associated with a particular SEPT value. By assigning the same name to several data cells each associated with a different SEPT value, the user can extract data from each of these data cells by using the one name rather than by specifying the location of each of the data cells.

X_INTEGRITY permits the user to set up the cross-integrity checks. For example, the data in the Income Statement can be compared against data in the Balance Sheet to see if they are equal. If the data is incorrect the system will prompt the user with an error. A status/error report listing integrity errors is also available at this point. This is part of the audit trail which is provided by the system.

The set-up functions allow (CREATE and INPUT) allow the user to do certain administrative tasks such as

TABLE II

May 20, 1987   copyright © 1986   Corp. Class Software   READY

```
CREATE INPUT QUERY ANALYZE REPORT TRANSFER MAINTAIN X-RUN    EXIT
  INPUT TEMPLATE
  HIERARCHY
                  ADD
  DICTIONARY
                  MODIFY
  RANGE           LIST
  X_INTEGRITY     INQUIRY
  SETUP

Database        Drive    Schedule  Entity       Period   Type    Memory
  C: DEMO.DB      C        INCOME    ACME         JAN 87   ACTUAL  149928
Add input template format, integrity rules and descriptions.
```

Table II illustrates the addition of entries in the DICTIONARY subfunction. The CREATE, DICTIONARY and ADD functions are all highlighted as create user passwords, enter data into system dictionaries, set default periods and types, and specify printer configurations.

The dictionaries form the basic structure of the system's data bases. Each function of the system refers to these dictionaries in order to validate data while processing. For example, if the user desires to input data for the first quarter of 1987 he must first enter this period in the Period Dictionary as Q1 87.

The preferred embodiment of the present invention uses six defined dictionaries. The following five dictionaries are required:

Period—To specify time periods such as Quarter, Year, Month and Day. The data base management system's operation is based on time periods which are specified by the user to conform to the user's unique reporting needs. All data is input for a specific period and all other dictionary entries are defined for that period.

Type—To specify the types of data being reported and analyzed. Common types are Actual, Standard Budget, and Forecast but the user may use and type any name he wishes.

Currency Rate Codes—To specify the currencies in which the user does business, such as dollar, peso, or yen.

Currency Rate Type—To specify how to convert the currencies used. Illustrative currency rate types are Average or End-of-year.

Entity—To describe the business units which send data to the user. An entity can be a subsidiary, division, product line, etc.

Although not necessary to proper operation of the system, a sixth dictionary is provided:

Account Description—To describe accounts (e.g., accounts payable, accounts receivable, cash, goodwill, etc.) to which the user will post journal entries and indicate their location on the input documents.

The dictionaries are provided for use at any level of the system's operation. Their record capacity is limited only by the user's computer storage capacity.

The HIERARCHY function allows the user to define data organizations which are identical to the structure of the user's financial organization. In creating a hierarchy entity, the user specifies the subsidiaries or subentities which report to a higher level entity and the percent of each subentity that is owned. As a result, when data is input into the data base, it is possible to consolidate financial data from the subentities in reports of the higher level entity or entities.

In prior art financial applications, the process of generating a consolidated report for a hierarchal environment is to first input the data for the detailed entity and then consolidate the information for a summary report. In addition to such a "batch" consolidation, the preferred embodiment of the present invention provides a unique "on line" consolidation. The "on-line" consolidation feature allows the user to see the effect of his entries on the higher levels of the report at the time he enters the detailed information with no need to wait for operation of a consolidation program such as used in "batch" consolidation.

Once the dictionaries are created, the system can be set up to accept incoming data. For example, the present invention interacts with a worksheet application such as LOTUS 1-2-3 ® by reading and writing data formulas, creating worksheets with very little data manipulation and supporting queries of the system's data base via LOTUS 1-2-3 ®. This interaction of LOTUS 1-2-3 ® is done in both the input stage and the output stage of the present invention.

To accommodate manual data input as well as automatic data input from an ASCII file or from a worksheet file, the user must ordinarily create an input template. As illustrated in Table II, the user can create an input template by selecting the CREATE function. This causes the system to display a submenu shown on the left side of Table II. When the user chooses the INPUT_TEMPLATE option, a further sub-menu appears which allows the user to ADD a new template or MODIFY, DELETE or LIST existing templates. Each input template is designed to handle data that is input from a particular type of financial schedule. For example, if subsidiary entities furnish data in an income statement or balance sheet, the user would create two input templates, one for the income statement schedule and one for the balance sheet schedule. For each template which represents a specific schedule, the user can enter data for any entity that uses or used such schedule for every period and type of data for which the schedule was used. Since most entities will use the same schedule for the same type of data over extended time periods, the user can often use a default Period and Type. Thus the only SEPT variation for data on any one template is Entity; and the user need only create the input templates required to handle data in the different formats or schedules used by the different Entities.

To define the input template, the user must specify the relationship between the data in whatever format it is found in the input file and the format in which it is desired to be arranged in the system database. Typically, all financial data is organized in rows and columns. For example, a corporation's income figures may be listed by rows and the periods (i.e., Q1 87, Q2 87) may be listed by columns. Thus the task of defining the input template is one of relating the columns and rows of data as formatted in the input file to the format of the system database.

The process is best illustrated with an example. Let us assume that the input file is an income statement entitled Income Statement 1 (IS1) for the Entity ABC, for the Period Q1 87 and for the Type Actual. The income statement might look like Table III as follows:

TABLE III

|  |  | A | B |
|---|---|---|---|
| 1. | Schedule | | IS1 |
| 2. | Entity | | ABC |
| 3. | Period | | Q1 87 |
| 4. | Type | | Actual |
| 5. | Income Statement 1 | | |
| 6. | | | |
| 7. | | | |
| 9. | | | Amt (000) |
| 10. | Sales | | 424 |
| 11. | Cost of Goods Sold | | 161 |
| 12. | Depreciation | | 64 |
| 13. | Selling and Admin. | | 93 |
| 14. | Total Operating Expenses | | 318 |
| 15. | Operating Profit | | 106 |
| 16. | Other Income | | 51 |
| 17. | Total Income | | 157 |
| 18. | Interest Expense | | 34 |
| 19. | Earnings Before Taxes | | 123 |
| 20. | Provisions for Taxes | | 57 |
| 21. | Net Income | | 66 |

TABLE IV

```
CREATE/INPUT_TEMPLATE                                                    READY
┌─────────────── ENTER ───────────────┐  PERIOD        : Q1 87
│ DESCRIPTION   : _____            │  TEMPLATE CODE : IS1
│ # OF ROW      : ___                 │  ┌─────── SELECTION ───────┐
│ # OF COLUMN   : ___                 │  │                          │
│ CURRENCY      : PARENT LOCAL        │  │                          │
│                                     │  │                          │
│ RATE TYPE     : _____            │  │                          │
│ DEMONINATION  : _____            │  │                          │
│ ARE THERE ANY FORMAT EXCEPTIONS? N Y│  │                          │
│ IS THIS A WORKSHEET TEMPLATE  ? N Y │  │ Press F3 key to make     │
│                                     │  │ a selection from select  │
│                                     │  │       window.            │
└─────────────────────────────────────┘  └──────────────────────────┘

Add input template format, integrity rules and descriptions.
```

Table IV is illustrative of a screen which is displayed to the user in response to a CREATE/INPUT TEMPLATE/ADD command. The user types the template name: INCOME STATEMENT 1 in the DESCRIPTION FIELD and presses the ENTER key to verify his entry. The user then fills in the rest of the information. In this example number of ROWS: 21, NUMBER OF COLUMNS: 1, CURRENCY: parent, RATE TYPE: Local, DENOMINATION: K(Thousand), ARE THERE ANY FORMAT EXCEPTIONS? N, IS THIS IS A WORKSHEET TEMPLATE? Y. By filling in this screen the user is specifying the number of rows and columns required to hold the data on the template. In filling in the number of rows, the user begins counting from the first row that contains data. The number of rows required need not match the number of rows in the schedule definition. It is usually a good idea to add a few extra rows in case the user miscounts so that input data will not be truncated. The CURRENCY selection allows the user to specify whether to use the Parent Currency (e.g. U.S. dollars) or to use local currency (e.g. Pesos). The DENOMINATION selection allows the user to specify whether the input amounts are in thousands, millions, etc.

If the data is input consistently, the user answers "NO" to ARE THERE ANY FORMAT EXCEPTIONS? If the data contains values such as cells with different formats such as different currencies and denominations, the user answers "YES." If the user answers, "YES," the system will prompt the user with a screen that allows the user to indicate where exceptions exist on the template. Therefore when inputting the data, the system will know to treat the specified fields that contain exceptions differently. If the user answers "Y" to IS THIS A WORKSHEET TEMPLATE?, the system knows that data will be input by a worksheet. Otherwise data can be input manually through the keyboard.

Upon completion of Table IV, a screen such as Table V is displayed. The top of the screen will allow the user to keep track of all of his function and subfunction selections. As indicated, in this example the user has chosen CREATE/INPUT-TEMPLATE/ADD. For the INPUT_TEMPLATE to be able to read a worksheet, it must be given instructions identifying from where on the worksheet the data is being extracted. The screen of Table V permits the user to give these instructions.

TABLE V

```
CREATE/INPUT-TEMPLATE/ADD
─────────────────────── ENTER ───────────────────────
        WORKSHEET TEMPLATE DEFINITION
              PERIOD : Q1 87              SCHEDULE : IS1
        ARE THERE MULTIPLE SEPT ON THE WORKSHEET ?  Y  N
        WHAT IS THE DIRECTION OF THE VARIABLE ?  ACROSS  DOWN
        FIRST DATA CELL : B10
        CELL LOCATIONS FOR : ___
              SCHEDULE : B1    FIRST ROW DESCRIPTION    : A10
              ENTITY   : B2    FIRST COLUMN DESCRIPTION : B9
              PERIOD   : B3
              TYPE     : B4
        IS THE WORKSHEET FILE READY ?  Y  N
        WORKSHEET FILE NAME : ABC
─────────────────────── INSTRUCTION ───────────────────────
        Enter cell locations where data begins, and where schedule,
        entity, period, and type are stored.

Add input template format, integrity rules and descriptions.
```

If the user wishes to extract all data from the worksheet beginning with Sales, he will specify the FIRST DATA CELL as B10 since the sales data (424) is located at that cell in the input and the template is defined to have 12 rows and 1 column. This will instruct the system to extract the data from the worksheet starting with cell B10 and continuing with all data cells on the worksheet.

In order for the system to associate the extracted data with its SEPT value, the location of the SEPT specification in the input file values must be indicated. These values are on the first four lines of column B of the input file of Table III. Accordingly, B1, B2, B3 and B4 are inserted after the prompts for these values on the screen of Table V.

|   |   |
|---|---|
| Schedule = | B1 |
| Entity = | B2 |
| Period = | B3 |
| Type = | B4 |

The user must also specify the location of the first row and column descriptions in response to screen prompts. In this example A10 contains the first row description "SALES. The user enters A10 after the prompt for the first row description. The user then enters the first column description. Since B9 contains the first column description "AMT", the user enters B9 after the prompt for the first column description.

The screen then prompts the user to designate if the worksheet is on the system and is ready to be processed. If the user indicates yes, the user enters the worksheet file name so the worksheet can be located and the worksheet is processed. The row and column descriptions from the input file are stored in the system's database. In addition if there are any formulas as part of the worksheet, they too are stored as part of the INPUT TEMPLATE definition.

When this process is complete, the computer system will ask the user if he wishes to print a status report. This status report describes the parameters of the worksheet that was just read in. It is a useful part of an audit trail.

This process is repeated for as many different input schedules as are used with the system. As will be apparent, this procedure eliminates the need for manual reentry of data and eliminates the need to massage data into ASCII files in order to be fed into a data base.

If, however, data is not available on an electronic worksheet, the system will accommodate manual entry of data as well. Again the CREATE/INPUT_TEMPLATE/ADD function is selected, the screen shown in Table IV is displayed and the user fills in the screen as described above. However, when he indicates in response to the last question on the screen of Table IV that this is not a worksheet template, the next screen displayed is an array of empty rows and columns of the size specified earlier in Table IV. The user then types in column and row headings to complete the manual input template.

Once the dictionaries, hierarchies and templates are created, the system is ready to accept data from electronic worksheets, computer data files and the keyboard. Table VI illustrates the screen used to input data from an existing electronic worksheet. After the user chooses the INPUT function, a submenu appears as shown on the left side of Table VI with the input choices: WORKSHEET, MANUAL, FILE, ENTRIES, and CALCULATED_DATA.

The WORKSHEET function allows the user to input data from a WORKSHEET directly into the database. The MANUAL function allows the user to manually enter data from hardcopy, such as standard reporting forms. FILE allows the user to input an ASCII or binary file directly into the database. ENTRIES allows the user to post, print and review journal entries. CALCULATED_DATA allows the user to create a new type of data by combining data from different periods and types (lateral consolidation). The user may then choose to input data from one of these choices by advancing the highlighting box from one choice to another by means of the cursor keys and pressing the ENTER key when the highlighted function is the desired function.

If the WORKSHEET function is chosen, the system will prompt the user by displaying a selection of available templates as illustrated on the right hand side of Table VI. For example, if the user wishes to enter data through the Income Statement 1 (IS1) template created in the foregoing discussion of Tables III-V, he would use the cursor keys to move the highlighter to the Income Statement 1 selection. The user would then press the enter key to confirm his selection. The template code "IS1" would then appear in the "ENTER" box in the middle of the screen. Once the template is chosen, the system will read in the worksheet data through the template and into the data base. The data from the input file will then be stored in the system's database in association with the SEPT value read from the input file of Table III in accordance with the location information specified in the input template of Table V. The data from the first data cell (B10) of the input file will be stored in the data cell$_1$ associated with that SEPT value and data from the succeeding cells (B11-B21) will be stored in data cells$_{2-12}$. By passing the worksheet through the template, the system checks the data to make sure it corresponds to integrity rules which are set up in the template. When the system has finished processing the data, it will update the data base and generate a status report.

TABLE VI

| May 20, 1987 copyright © 1986 Corp. Class Software | SELECT |
|---|---|

CREATE <u>INPUT</u> QUERY ANALYZE REPORT TRANSFER MAINTAIN X-RUN EXIT

TABLE VI-continued

```
┌─────────────────┬──────────────────┬──────────────────────────────────┐
│ WORKSHEET       │                  │                                  │
│ MANUAL          │ ── ENTER ──      │ ── SELECTION ──                  │
│ FILE            │ PERIOD  : JAN 87 │ DESCRIPTION      CODE            │
│ ENTRIES         │ TEMPLATE: IS1    │ BALANCE SHEET    BS              │
│ CALCULATED_DATA │                  │ inc              inc             │
│                 │                  │ INCOME STATEMENT IS1             │
│                 │                  │ KEY STATISTICS   KEY STAT        │
│                 │                  ├──────────────────────────────────┤
│                 │                  │ Move up an down arrows to        │
│                 │                  │ select. Press enter to           │
│                 │                  │ register choice.                 │
└─────────────────┴──────────────────┴──────────────────────────────────┘
```

Input data from worksheet to a defined input template.

Production

Once data has been input into the computer system, the user can study relationships between various data elements by querying the data. This is the production phase. This phase uses the INPUT, QUERY, ANALYZE, REPORT, TRANSFER, X-RUN, EXIT and POP-UP functions.

The QUERY function can generate reports from the system's data base without the requirement of typing by the user. As in the case of the INPUT_TEMPLATE function, this is a matter of format conversion, but now from the format of the system's data base to that of the report.

To better understand the QUERY function, it is helpful to understand the structure of the report generated by this function. A typical report is illustrated in Table VII.

TABLE VII

```
07:06:38
May 19, 1987    QUERY                                      Pg.1
┌─────────────────────────────────────────────────┐
│           FY 87      FY 87      FY 87    FY 87  │
│           ABC        ABC        ASC      ACS    │
│           ACTUAL     BUDGET     ACTUAL   BUDGET │
│           A          B          C        D      │
│ 1 Sales   161        170        249      274    │
│ 2 Expenses 178       163        163      174    │
└─────────────────────────────────────────────────┘
```

As will be apparent the report is a two-dimensional array of data. The column headings in this example specify Periods, Entities and Types. Other combinations of up to three of the four SEPT dimensions are possible. These headings are selected by the user by means of the QUERY function and a sub-function named ACROSS. In this example, the row headings are elements of a Schedule; but other headings selected from the SEPT dimensions not used as column headings can be used. The headings are specified by the user by means of QUERY and a sub-function named DOWN.

Table VIII is illustrative of the screen that is displayed when the QUERY function is selected.

TABLE VIII

```
May 20, 1987 copyright © 1986 Corp. Class Software                    READY
┌─────────────────────────────────────────────────────────────────────────┐
│ CREATE  INPUT  QUERY  ANALYZE  REPORT  TRANSFER  MAINTAIN  X-RUN  EXIT  │
│ ┌────────┐                                                              │
│ │ DEFINE │                                                              │
│ │ RUN    │                                                              │
│ │ LIST   │                                                              │
│ │ COPY   │                                                              │
│ │ ERASE  │                                                              │
│ │ MODIFY │                                                              │
│ └────────┘                                                              │
│                                                                         │
│ Database       Drive       Schedule Entity    Period   Type    Memory   │
│ C: TUTOR. DB   C                              02 86    ACTUAL  146656   │
└─────────────────────────────────────────────────────────────────────────┘
Define the parameters for a query or a model.
```

The DEFINE function allows the user to define a query. For example, the user will set up column and row headings for the report, set up selection criteria, set up format and specify output mode. Column and row headings will be selected from available values of the four SEPT categories.

The RUN function generates a report or a worksheet in response to a query defined by the DEFINE function.

The LIST function lists the available queries that have been established by the DEFINE function. This will allow the user to review his selection criteria, report format and output modes.

The COPY function allows the user to copy an existing query to a new query.

The ERASE function deletes an existing query.

The MODIFY function allows value modifications to an existing query.

By selecting the DEFINE function, the user prompts the system to display a submenu which lists all subfunctions available from the DEFINE function. Table IX is illustrative of the screen displayed to the user once he has chosen the DEFINE function. The user may now go through all of these subfunctions in order to define his query.

specified. An exceptions option allows the user to specify all ranges which do not follow the query's global data precision rules.

The TOTALS subfunction allows the user to perform various calculations with the extracted data prior to presentation in the report. Some of the calculations available are Sum, Average, Mean & Sum, Variance,

TABLE IX

```
May 20, 1987 copyright © 1986 Corp. Class Software                                    READY
   CREATE  INPUT  QUERY  ANALYZE  REPORT  TRANSFER  MAINTAIN  X-RUN  EXIT DEFINE
   RUN      ACROSS
   LIST     DOWN
   COPY     VALUES
   ERASE    FORMAT
   MODIFY   TOTALS
            SAVE Database      Drive        Schedule Entity          Period    Type     Memory
   C: TUTOR. DB  C                                     02 86     ACTUAL   146656
Define the attributes that are going across a query.
```

The ACROSS subfunction allows the user to select at most three of the four SEPT variables (SCHEDULE, ENTITY, PERIOD, TYPE) to be used to define the column headings for a query. The order of selection of the attributes determines their relative levels in the column heading.

The DOWN subfunction allows the user to select the remaining SEPT variables (at most three of the four SEPT variables) to be used to define the row headings for a query. The order of selection of the attributes determines their relative levels in the row headings.

The VALUES subfunction permits the user to specify available range values for use as row headings.

Once all values are selected, the user may define his report format by choosing the FORMAT subfunction from the Query/Define submenu illustrated in Table IX. This subfunction generates a menu that leads the user through specification of headers (report titles), trailers (footnotes), and data precision (the number of decimal places) and provides the user a choice between sending the report to a printer or an electronic worksheet. In addition, default items or currency may be Ratio, Variance & Percentage, and Percent Variance which the system calculates for the rows across the query. The system can also perform these calculations by columns down the query.

SAVE allows the user to store the definition of a query.

If the user selects the ACROSS subfunction by depressing the ENTER key while that function is highlighted, the screen shown in Table X will be displayed. The user selects the column headings from the selection menu shown on the right side of Table X in the order in which they are to appear in the lines of the report. Each selection is made by advancing a highlighter through the selection menu and depressing the ENTER key when the desired SEPT category is highlighted. As each selection is made the selection is displayed in the order of selection in the ENTER box in the center of Table X. The ENTER key is again depressed in order to verify the selections.

The selection for the DOWN attributes is performed in similar fashion using a similar selection menu.

TABLE X

```
May 20, 1987 copyright © 1986 Corp. Class Software                                   SELECT
   CREATE  INPUT  QUERY  ANALYZE  REPORT  TRANSFER  MAINTAIN  X-RUN  EXIT

─ DEFINE ─

ACROSS           ── ENTER ──              ── SELECTION ──
      DOWN          ACROSS ATTRIBUTES
      VALUES        (HIERARCHICAL ORDER)        ENTITY
      FORMAT                                    PERIOD
      TOTALS             ENTITY                 TYPE
      SAVE                                      SCHEDULE
                         ─────
                         ─────
                                               "+" to select attributes
                                               [ENTER] to register choices
                                               [ESC] to redo
```

TABLE X-continued

Define the attributes that are going across a query.

After the user has selected his DOWN attributes, he selects the exact types of data to be displayed on the Query by means of the VALUES function. Once the user chooses this function the system will display a series of similar menus that lead the user through all of the SEPT values available in the system. The first screen displayed is the Period selection screen. As illustrated in Table XI, the user selects his periods by positioning the cursor and pressing the "+" key. The user may select any combination of periods. Table XI is illustrative of a screen in which the user has selected FY87. After the period is selected, the system will display a screen depicted in the Table XII showing the selected periods. The user then presses the "ENTER" key in order to verify his selections.

TIES and SCHEDULES and prompts the user to select which of these are to be used.

Once the user chooses a SCHEDULE, the system will prompt the user to enter RANGES to be extracted from the data base. Table XIII is illustrative of the screen which is displayed by the system. As in the case of the selection of Periods depicted in conjunction with Table XI, the user chooses the ranges in the order in which they are to be displayed on the Query report. Once the ranges are selected, the system will display the selections in the order in which they are selected just as it displayed the Periods selected as in Table XII. The user presses the "ENTER" key in order to verify his selection. The system will then display the QUERY/DEFINE submenu as illustrated in Table IX and

TABLE XI

May 20, 1987 copyright © 1986 Corp. Class Software                                                                                  READY

CREATE   INPUT   QUERY   ANALYZE   REPORT   TRANSFER   MAINTAIN   X-RUN   EXIT

— DEFINE —

| ACROSS | | |
| DOWN | PERIOD | PERIOD CODE |
| VALUES | FY87 | NOV 86 |
| FORMAT | | DEC 86 |
| TOTALS | | JAN 87 |
| SAVE | | FEB 87 |
| | | MAR 87 |
| | | APR 87 |
| | | MAY 87 |
| | | Jun 87 |
| | | Jul 87 |
| | | AUG 87 |
| | | FY 87 |

| Database    | Drive | Schedule Entity | Period | Type   | Memory |
| C: TUTOR, DB | C     |                 | 01 86  | ACTUAL | 145640 |

Update the headers.

TABLE XII

May 20, 1987   copyright © 1986   Corp. Class Software                                                                                   VIEW

CREATE   INPUT   QUERY   ANALYZE   REPORT   TRANSFER   MAINTAIN   X-RUN   EXIT

— DEFINE —

| ACROSS | | |
| DOWN | ENTER | CONFIRMATION |
| VALUES | PERIOD | PERIOD IN SELECTED ORDER |
| FORMAT | | FY 87 |
| TOTALS | SELECTED | |
| SAVE | | |

[ENTER] to accept
[ESC] to redo

Define the values for the attributes needed.

In similar fashion, the system then displays, in order, screens that list the available TYPES of data, ENTITIES and SCHEDULES and prompts the user to select the highlighter will be positioned on the FORMAT function.

TABLE XIII

```
May 20, 1987    copyright © 1986   Corp. Class Software                    READY

| CREATE  INPUT  QUERY  ANALYZE  REPORT  TRANSFER  MAINTAIN  X-RUN  EXIT |
|  ——DEFINE——                                                            |
|  ┌─────────┐   ┌──────────────┐    ┌──────────────────┐                |
|  │ ACROSS  │   │ SCHEDULE NAME│    │ RANGE CODE       │                |
|  │ DOWN    │   │      BS      │    │ ACCR TAXES       │                |
|  │ VALUES  │   │              │    │ ACCR WAGES       │                |
|  │ FORMAT  │   │              │    │ ACCT REC - NET   │                |
|  │ TOTALS  │   │              │    │ ACCTS PAYABLES   │                |
|  │ SAVE    │   │   RANGES     │    │ CCUM DEPREC      │                |
|  └─────────┘   └──────────────┘    │ CAPITAL STOCK    │                |
|                                    │ CASH             │                |
|                                    │ CIP              │                |
|                                    │ CURR LIAB        │                |
|                                    └──────────────────┘                |
|                                                                        |
|  Database      Drive     Schedule   Entity   Period  Type     Memory   |
|  C:TUTOR.DB    C                             01 86   ACTUAL   145640   |

Update the headers.
```

When the FORMAT subfunction is selected it displays a menu that lists the sub-subfunctions HEADERS, TRAILERS, OUTPUT_TO, EXCEPTIONS and DEFAULT.

HEADERS allows the user to define the report headings.

TRAILERS allows the user to define trailer or footnote information.

OUTPUT_TO allows the user to specify whether the output should be directed to a report or a worksheet.

EXCEPTIONS allows the user to specify all queries which do not follow the query's global decimal precision rules (i.e. the number of decimal places).

The DEFAULT option allows the user to change certain report formats. For example the user may wish to display all data to thousands (1000), change column widths and display dates.

Upon completing his definition of QUERY, the user then returns to the main QUERY menu shown in Table VIII and executes the RUN function for this QUERY. The system then retrieves data from the data cells of the database in accordance with particular SEPT and RANGE values specified and outputs this data to a particular report or worksheet as specified.

Data input and output may also be made through the X-RUN function. As illustrated in Table XIV, the user accesses the X-RUN function from the main menu. Once in X-RUN, a submenu will appear as shown in Table XIV that displays the choices of programs previously loaded into the computer system that can be accessed from within the computer system. The X-RUN function allows the user to access these other programs while in database management program of the present invention without having to go through the operating system of the computer.

TABLE XIV

```
May 20, 1987    copyright © 1986   Corp. Class Software                    READY

| CREATE  INPUT  QUERY  ANALYZE  REPORT  TRANSFER  MAINTAIN  X-RUN  EXIT |
|  ┌─────────────────┐                                                   |
|  │ SPREADSHEET     │                                                   |
|  │ DOW_JONES       │                                                   |
|  │ GRAPHICS        │                                                   |
|  │ COMMUNICATIONS  │                                                   |
|  │ W-PROCESSING    │                                                   |
|  │ RELATIONAL      │                                                   |
|  │ APPLICATION     │                                                   |
|  │ OTHER           │                                                   |
|  └─────────────────┘                                                   |
|                                                                        |
|                                                                        |
|                                                                        |
|  Database      Drive     Schedule   Entity   Period  Type     Memory   |
|  C:DEMODB      C                             FEB 87  ACTUAL   141440   |

Run spreadsheet packages.
```

The selection of programs depicted in Table XIV is illustrative. Such selection might include:

SPREADSHEET allows the user to access existing spreadsheets.

DOW_JONES is a software package which allows the user to access information in stocks and bonds.

GRAPHICS allows the user to access software packages that display charts such as pie charts and bar charts.

COMMUNICATIONS allows the user to access telecommunications packages.

WORD PROCESSING allows the user to access available word processing packages.

RELATIONAL allows the user to access other database packages.

APPLICATION allows the user to run certain "user defined" applications such as programs that the user has coded in various computer languages.

OTHER allows the user to access any miscellaneous application or file resident on the computer.

Whichever function the user selects, the system will then prompt the user if he wishes to use POP-UP. POP-UP will allow the user to toggle between the program of the present invention and a program that is outside the present system. In order to extract data from the data base and transfer it to such program, the user accesses the POP-UP function by pressing the ALT/Z keys. This function is available from any point in the system. After accessing POP-UP, the user selects the LINK function. LINK allows the user to extract data from the data base and load it into the external program.

Table XV is illustrative of a typical reference file which is used to extract data from the computer system and display it in a worksheet in an external program. When the user selects the LINK function, the system will search through the worksheets resident on the computer and display a listing of them in a selection window. A particular worksheet can then be selected.

A double pound sign (##) indicates that the codes and values that follow it apply globally across the worksheet. They continue to do so until another ## appears with different values for the same codes. The second set of values then replaces the first set in that the system will extract data from the source designated by the code after the double pound sign.

In column A of Table XV the first code ##S=I/S indicates that all schedule data in the top part of the reference file comes from the schedule identified by the code I/S. The second code ## S=B/S six rows below it then replaces the first; and all schedule data now comes from the schedule identified by the code B/S.

A single pound sign (#) indicates that the code and value that follow it apply to one row, column, or cell. It applies until another # and code is encountered. The new code and its value then replace the previous code and value.

In addition to pound signs the reference file extracts information based on a series of codes. Three types of codes are used in the reference file. The first type of code controls the direction in which other codes apply on the reference file. An "A" indicates that the codes which follow it run across the reference file. All codes not preceded by an "A" either run down the reference file or are global. The second type of code specifies what data to extract while creating an output file. For example, "B" is used to specify a type of Balance. The third type of code allows the user to format data. For

TABLE XV

```
A1: [W14] '##A=E;T=ACTUAL                                    READY
       A                  B            C      D      E      F
 1.  ##A=E;T=ACTUAL;P=FY86
 2.                        ************************************************
 3.                            FINANCIAL HIGHLIGHTS
 4.                                  EOY 1986
 5.                        ************************************************
 6.                                 ABC    ASC    FWS    CORP
 7.  ##S=*I/S                       ___    ___    ___    ____
 8.  #R=SALES           SALES
 9.  #R=TOT_OP-EXP      TOTAL OP. EXP.
10.  #R=BEFOR_TAX       PRE-TAX EARNINGS
11.  #R=NET_INC         NET INCOME
12.
13.  ##S=B/S
14.  #R=T_CURRASST      TOTAL CURR ASSETS
15.  #R=TOT_ASSETS      TOTAL ASSETS
16.  #R=T_CURRLIA       TOTAL CURR LIABS
17.  #R=TOT_LIAB        TOTAL LIABILITIES
18.  #R=RET_EARN        RETAINED EARNINGS
19.  #R=T_EQTY          TOTAL EQUITY
20.                     RETURN ON SALES
25-Nov-86   12:09 AM
```

After a worksheet is selected, it is modified by the addition of codes in the first column and row of the worksheet which tell the computer system what data to extract from the database and where to display it in the modified worksheet. This modified worksheet is referred to as a reference file.

All reference file codes have three parts:
(1) An identifier which is a pound sign (#) or double pound sign (##)
(2) A code
(3) A value.

Every reference file begins with a pound sign (#) or double pound sign (##). These signs tell the worksheet program that the following characters are codes rather than cell entries. They also control how the codes apply on the worksheet.

example, the code "Z" allows the user to display a zero in a cell location for which an entity has not provided data.

The codes used are as follows. A (Across) indicates that the codes which follow it apply globally across the worksheet. Any codes and values not prefaced by "A" apply down the worksheet or globally. This code has no default value S (Schedule) extracts schedule data from the database. The value indicates the specific Schedule data. E (Entity) extracts Entity data from the database. P (Period) extracts Period data from the database. T (Type) extracts Type data from the database. R (Range Name) indicates a specific range name on a schedule. C (Cell Location) indicates a cell location on a schedule. The value gives the specific cell location of the data to extract. F (Factor) assigns a denomination to the reference file (i.e. mm=millions). B (Balance) assigns a balance to the reference file. The value indicates the type of balance. $T (Currency Type) assigns a currency type to the reference file to convert extracted data. $R (Currency Rate) assigns a currency rate to the reference file to convert extracted data. D (Decimals) sets the number of decimal places on the reference file. % (% Ownership) specifies percent ownership in an entity for calculation. >(Range Limit) indicates the limit of a code on the reference file. The value indicates the column or row and must be equal to or greater than the current column or row. Z (Zero) displays "0" in a reference file cell to signal missing entity data. O (Option) indicates if the codes should be included in the output file. The value indicates if the code is active. * (Wild Card) accepts several values for Period, Type, or Entity and creates an output file for each one from the one reference file.

Thus with reference to Table XV, the "A" in Line 1 indicates that the codes that follow it apply globally across the worksheet. Thus, for the specified Entities "E" the file will extract actual FY86 data.

Line 7 indicates that the following data will be extracted from Schedule I/S. Line 8 indicates that the reference file will extract from the database all data for the Range "SALES" from the I/S Schedule for ENTITIES ABC, ASC, FWS, CORP. Line 9 indicates that the file will extract from the data base and display on the worksheet all data from the Range "TOT_OP-EXP" (Total Operating Expense) for ENTITIES ABC, ASC, FWS, CORP and so on. Line 13 indicates that the reference file now extracts data from schedule B/S.

Once the codes have been entered, the user may use the computer system's VALIDATE function to check for syntax errors. The validation function searches down and across the worksheet for syntax errors. After validation and error correction, the reference file may be linked to the computer system; and data may be extracted and loaded into the reference file. The user selects the LOAD option and enters the reference file name. The user then enters the output file name, illustratively the LOTUS 1-2-3 ® worksheet.

The computer system then loads the data into the worksheet by reading the reference codes, extracting the requested information from the data base, loading each cell in the worksheet one by one and then reading the next reference code. The process of reading the reference codes is continued until the system reaches the end of file record on the worksheet. While coding a reference file, the user may forget certain pieces of information. The present invention allows the user to review data from any point on the system by toggling between different software packages or by using the "POP-UP" utility program.

As part of the production phase, the user may also modify an existing query's values using the ANALYZE function available on the main menu. The user selects an existing Query and specifies the desired Period. The pre-defined period will be displayed. The user may modify the period by selecting a new period. The modification functions also apply to TYPE, ENTITY and SCHEDULE as long as these values are pre-defined ACROSS values. Table XVI is illustrative of the submenu which appear when the user selects the ANALYZE function.

The REPORT function allows the user to create customized reports and generate them individually or several at a time using a "batch mode". Once the report definition has been completed, the user can run a number of defined reports by creating a "batch" job. The user accesses the BATCH function which is a submenu under the REPORT function and selects the reference files to be used for extracting and displaying the data. The system verifies that the selected worksheets are available and are syntactically correct. Next the system will load the selected worksheets with data from the database. The system then performs an automatic recalculation of values according to the formulas resident on the worksheet. Lastly the reports are generated according to the report definition.

As part of the REPORT/FORMATTER capabilities, the user can generate a report for all entities that belong under a specific hierarchy. For example, the system can generate reports for each department of a corporation. The report formats will be identical for each entity. This feature obviates the need for the user to define separate reports for each entity. Another way the system diminishes the need for user defined reports is by relative referencing. For example, suppose the user needs to generate a standard report consisting of the current months. By adding a code of #P=M−0 and #P=M−1 to the reference file, the system will generate the appropriate data in that #P=M−0 equals current month and #P=M−1 equals current month minus 1 month. The user can also access this capability for days, weeks and quarters. Table XVII is illustrative of the submenu which will appear when the user selects the Report function.

The TRANSFER function allows the user to extract and transfer reported_data, dictionary data, worksheet data and other files from one data base to another to a file or to a diskette. Table XVIII is illustrative of the submenu which is displayed when the TRANSFER function is selected.

The MAINTAIN command allows the user to perform various system administration tasks such as managing passwords, inputting data, creating data bases and establishing links to outside software packages Table XIX is illustrative of the submenu displayed when the user selects the MAINTAIN function.

TABLE XVI

May 20, 1987   copyright © 1986   Corp. Class Software                                              READY

| CREATE | INPUT | QUERY | ANALYZE | REPORT | TRANSFER | MAINTAIN | X-RUN | EXIT |
|---|---|---|---|---|---|---|---|---|
| ACROSS_VALUES | | | | | | | | |

| Database | Drive | Schedule | Entity | Period | Type | Memory |
|---|---|---|---|---|---|---|
| C:DEMO.DB | C | | | FEB 87 | ACTUAL | 141288 |

TABLE XVII

May 20, 1987   copyright © 1986   Corp. Class Software                                              READY

| CREATE | INPUT | QUERY | ANALYZE | REPORT | TRANSFER | MAINTAIN | X-RUN | EXIT |
|---|---|---|---|---|---|---|---|---|
| QUERY FORMATTER | | | | | | | | |

| Database | Drive | Schedule | Entity | Period | Type | Memory |
|---|---|---|---|---|---|---|
| C:DEMO.DB | C | | | FEB 87 | ACTUAL | 141440 |

TABLE XVIII

May 20, 1987   copyright © 1986   Corp. Class Software                                              READY

| CREATE | INPUT | QUERY | ANALYZE | REPORT | TRANSFER | MAINTAIN | X-RUN | EXIT |
|---|---|---|---|---|---|---|---|---|
| REPORTED_DATA DICTIONARY WORKSHEET FILES | | | | | | | | |

| Database | Drive | Schedule | Entity | Period | Type | Memory |
|---|---|---|---|---|---|---|
| C:DEMO.DB | C | | | FEB 87 | ACTUAL | 141240 |

TABLE XIX

May 20, 1987   copyright © 1986   Corp. Class Software                                              READY

| CREATE | INPUT | QUERY | ANALYZE | REPORT | TRANSFER | MAINTAIN | X-RUN | EXIT |
|---|---|---|---|---|---|---|---|---|
| LIST CONTROL DATABASE ZAP(PURGE) PASSWORD X_RUN SET_UP REPORT | | | | | | | | |

| Database | Drive | Schedule | Entity | Period | Type | Memory |
|---|---|---|---|---|---|---|
| C:DEMO.DB | C | | | FEB 87 | ACTUAL | 141288 |

Ad-hoc Analysis

The data base management system allows the user to create "models" which simulate an activity such as the workings of a business. The modeling function allows the user to perform analysis on values extracted from the financial database and on estimated user defined values.

When building a model the user specifies the relationships between data. For example, in a business model the ratio between net income and sales is a relationship that determines the return in sales.

The modeling capability is performed as part of the QUERY function. It takes the capabilities of QUERY one step further by allowing the user to define relationships between data. To build a model, the user selects QUERY and defines the ACROSS and DOWN column and row headings with the limitation that the down attribute can only be Schedule. The user then selects VALUES and specifies PERIOD, TYPE and ENTITY which are generated as illustrated in Tables XI and XII. For SCHEDULE the user enters the word MODEL. Once the model function is invoked, the system will display a screen such as that illustrated in Table XX with a series of numbered rows and with the selected PERIOD, TYPE and ENTITY categories arranged in column headings.

TABLE XX

| QUERY DEFINE VALUES | | | | | READY |
|---|---|---|---|---|---|
| ABC FORECAST | FY 86 A | FY 87 B | FY 88 C | FY 89 D | E |

|   |
|---|
| 1 |
| 2 |
| 3 |
| 4 |
| 5 |
| 6 |
| 7 |
| 8 |
| 9 |
| 10 |
| 11 |
| 12 |
| 13 |
| 14 |
| 15 |
| 16 |

Define the criteria of the variables needed.

The user then completes his model by filling in the modelling relationships in the order he wants them in the rows.

For example, in Row 1, the user chooses the PRICE range from the IS2 schedule.

In Row 2, the user defines the estimated price for FY 86 as ESTIMATED PRICE=PRICE.IS2, @ PREVIOUS*1.05. This will calculate the price at current price×1.05.

In Row 3, the user chooses the UNITS range from IS2 and defines the UNITS as UNITS.IS2.

In Row 4, the user may display the forecasted UNITS for FY86 and then increase the UNITS for each subsequent period by 5% every period. This is accomplished by the relation:

ESTIMATED UNITS=@ GROW (UNITS.IS2, 0.05).

In Row 5, the user may calculate revenues by multiplying ESTIMATED UNITS times ESTIMATED PRICE. During the calculation the user may also convert ESTIMATED UNITS to integers and round ESTIMATED PRICE to two decimal places. This is modelled by the relation

REVENUES=@ INT (ESTIMATED UNITS * @ ROUND (ESTIMATED PRICE, 2)). @ INT is the function that converts values to integers and @ ROUND rounds values to a specified decimal place.

The modeling worksheet will now look as illustrated in Table XXI.

TABLE XXI

| QUERY DEFINE VALUES | | | | | READY |
|---|---|---|---|---|---|
| ABC FORECAST | FY 86 A | FY 87 B | FY 88 C | FY 89 D | E |
| 1 PRICE.IS2 | | | | | |
| 2 ESTIMATED PRICE=PRICE.IS2, @PREVIOUS*1.05 | | | | | |
| 3 UNITS.IS2 | | | | | |
| 4 ESTIMATED UNITS=@GROW(UNITS.IS2, 0.05) | | | | | |
| 5 REVENUES=@INT(ESTIMATED UNITS*@ROUND(ESTIMATED PRICE,2)) | | | | | |
| 6 | | | | | |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | |
| 16 | | | | | |

Define the criteria of the variables needed.

The user may now select desired categories of modeling functions. The functions are divided into five categories: Financial, Mathematical, Forecasting, Date and Special.

The financial functions contain such values as Future Value, Internal Rate of Return, Payment Periods and the like.

The mathematical functions contains such values as absolute value, averages and cosines.

The forecasting functions allow the user to compute growths and trends.

The date functions compute days, months and the like.

The special functions allow certain expressions to be repeated, reference the value of a variable subsequent to a current column and reference the value of a variable preceding the current column.

In this example, the user may select FORECASTING and within FORECASTING the GROW function.

In rows 6 through 11, the user may estimate costs for RAW MATERIAL, DIRECT LABOR and DISTRIBUTION. These variables are Range names associated with specific data in the data base.

RAW_MAT.IS2

RAW MATERIAL=@GROW(RAW_MAT.IS2, 0.15)

DIR_LAB.IS2

DIRECT LABOR=@GROW(DIR_LAB.IS2, 0.06)

DISTR.IS2

DISTRIBUTION=@GROW(DISTR.IS2, 0.04)

This example specifies that RAW MATERIAL grow by 15%, DIRECT labor by 6% and DISTRIBUTION by 4%.

In Row 12, the user totals these amounts into COSTS OF SALES.

COST OF SALES=@SUM(RAW MATERIAL, DIRECT LABOR, DISTRIBUTION)

Row 13 calculates GROSS PROFIT GROSS PROFIT=REVENUES-COST OF SALES

Rows 14 and 15 define DEPRECIATION.

DEPR.IS2

DEPRECIATION=@FOR(2,66000), @PREVIOUS*1.1

Rows 16 and 17 define SELLING and ADMINISTRATION costs.

SELADM.IS2

SELLING AND ADMIN=@GROW(SELADM.IS2, 0.10)

(The cost will grow by 10%.)

Row 18 defines OPERATING EARNINGS:

OPERATING EARNINGS=@INT(GROSS PROFIT-DEPRECIATION-SELLING AND ADMIN)

Row 19 defines OPERATING MARGIN. OPERATING MARGIN=OPERATING

EARNINGS/REVENUES*100

The worksheet is now displayed as illustrated in Table XXII.

TABLE XXII

| QUERY DEFINE VALUES | | | | | READY |
|---|---|---|---|---|---|
| | FY 86 | FY 87 | FY 88 | FY 89 | |
| ABC FORECAST | A | B | C | D | E |
| 5  REVENUES=@INT(ESTIMATED UNITS*@ROUND(ESTIMATED PRICE,2)) | | | | | |
| 6  RAW-MAT.IS2 | | | | | |
| 7  RAW MATERIAL=@GROW(RAW-MAT.IS2,0.15) | | | | | |
| 8  DIR-LAB.IS2 | | | | | |
| 9  DIRECT LABOR=@GROW(DIR-LAB,IS2,0..06) | | | | | |
| 10 DISTR.IS2 | | | | | |
| 11 DISTRIBUTION-@GROW(DISTR.IS2,0.04) | | | | | |
| 12 COST OF SALES=SUM(RAW MATERIAL,DIRECT LABOR, DISTRIBUTION) | | | | | |
| 13 GROSS PROFIT=REVENUES-COST OF SALES | | | | | |
| 14 DEPR.IS2 | | | | | |
| 15 DEPRECIATION=@FOR(2,66000).@PREVIOUS*1.1 | | | | | |
| 16 SELADM.IS2 | | | | | |
| 17 SELLING AND ADMIN=@GROW(SELADM.IS2,010) | | | | | |
| 18 OPERATING EARNINGS=@INT(GROSS PROFIT-DEPRECIATION-SELLING AND ADMIN) | | | | | |
| 19 OPERATING MARGIN=OPERATING EARNINGS/REVENUES*100 | | | | | |
| 20 | | | | | |

Define the criteria of the variables needed.

Once the variables have been defined the system will take the model and generate a Query report as illustrated in Table XXIII.

TABLE XXIII

| 02:00:32 10/09/86 | | EXP12 | | | Pg. 1 |
|---|---|---|---|---|---|
| Model Example #2 | | FY 86 | FY 87 | FY 88 | FY 89 |
| ABC FORECAST | | A | B | C | D |
| 1 | PRICE.IS2 | 8.48 | | | |
| 2 | ESTIMATED PRICE | 8.48 | 8.904 | 9.3492 | 9.81666 |
| 3 | UNITS.IS2 | 50000 | | | |
| 4 | ESTIMATED UNITS | 50000 | 52500 | 55125 | 57881.25 |
| 5 | REVENUES | 423999 | 467249 | 515418 | 568393 |
| 6 | RAW-MAT.IS2 | 92000 | | | |
| 7 | RAW MATERIAL | 92000 | 105800 | 121670 | 139920.5 |
| 8 | DIR_LAB.IS2 | 50000 | | | |
| 9 | DIRECT LABOR | 50000 | 53000 | 56180 | 59550.8 |
| 10 | DISTR.IS2 | 19000 | | | |
| 11 | DISTRIBUTION | 19000 | 19760 | 20550.4 | 21372.416 |
| 12 | COST OF SALES | 161000 | 178560 | 198400.4 | 220843.716 |
| 13 | GROSS PROFITS | 262999 | 288689 | 317017.6 | 347549.284 |
| 14 | DEPR.IS2 | 64000 | | | |
| 15 | DEPRECIATION | 66000 | 66000 | 72600 | 79860 |
| 16 | SELADM,IS2 | 93000 | | | |

The modeling feature of this system allows the user to extract data from the data base and plug this data into formulas so that it may be further analyzed.

In other known packages, in order to analyze data the user would have to manually plug in the values rather than extract it from an existing data base. Therefore, the system combines a data base management system with a sophisticated financial modeling package.

Software

An object code embodiment of the software that implements the functions described above is provided herewith on a floppy disk as part of this application. A description of this software is set forth in conjunction with FIGS. 2-26.

Figure 2:
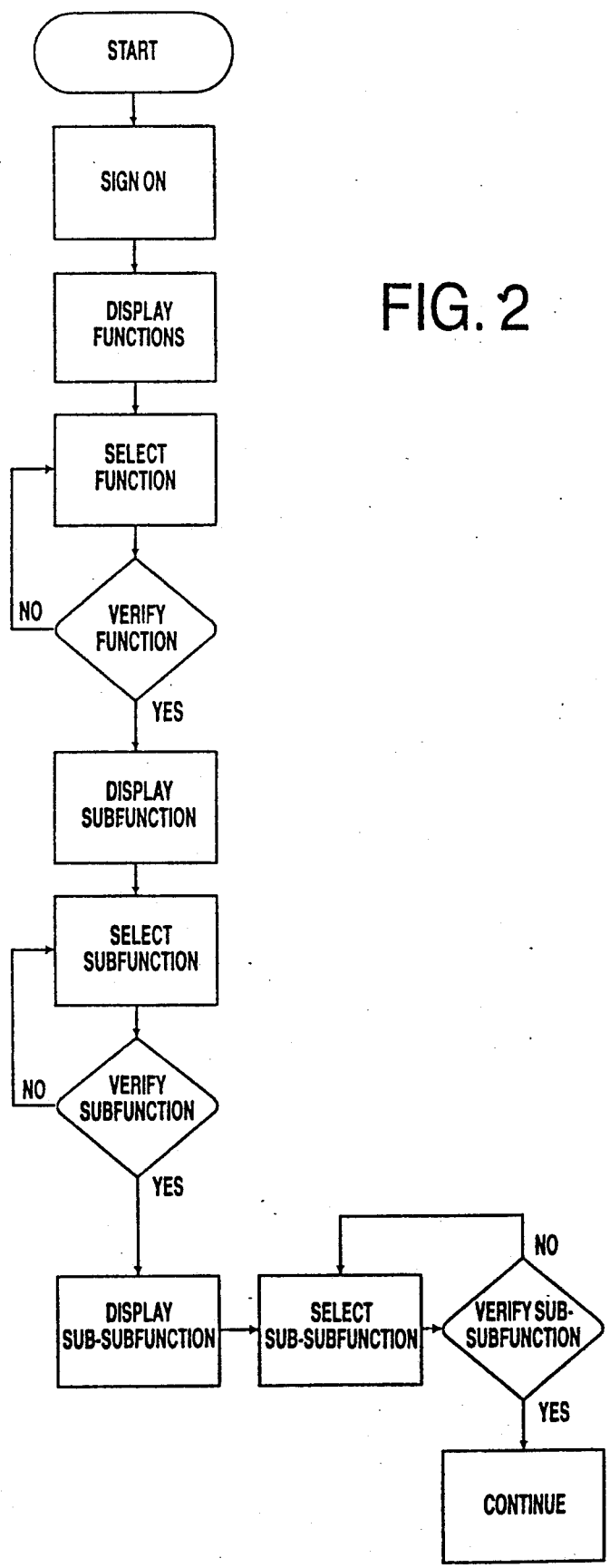
FIG. 2 is a flow chart depicting the user's interaction with the system.

A flowchart depicting the use of the system from the user's viewpoint is shown in FIG. 2. The user signs on; the main screen as illustrated in Table I is displayed on display 32; and the user selects and verifies a function from the displayed functions. Upon verification of a function, a menu of subfunctions such as that shown on the left side of Table II is displayed for the user's selection; and upon selection and verification of subfunction, a menu of subfunctions such as shown in Table II is displayed for the user's selection and so on. Throughout the process at least the function selected from each of the preceeding menus is displayed on display 32.

As shown in Table I, the main menu provides nine primary functions: Create, Input, Query, Analyze, Report, Transfer, Maintain, X-Run and Exit, and a tenth, Pop-up, is available through the keyboard. The software that implements the Create function is described in more detail in the flowcharts of FIGS. 3A-6B and that which implements Input in the flowcharts of FIGS. 7-18. Query is described in conjunction with FIGS. 19-23 and Pop-up in conjunction with FIGS. 24-26.

Figure 3A:
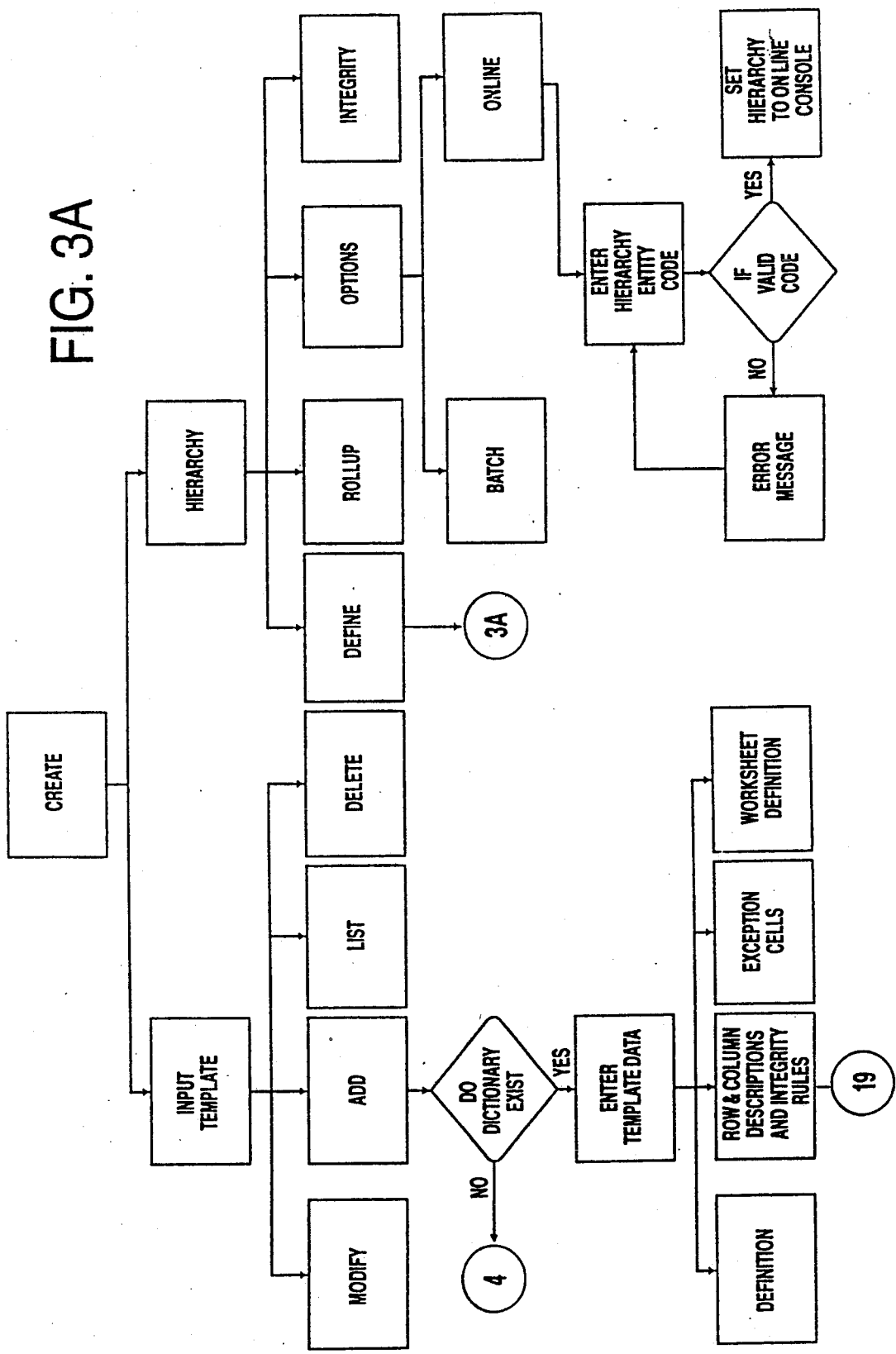
FIGS. 3A-6B are flowcharts depicting the implementation of the Create function of the present invention.
Figure 3B:
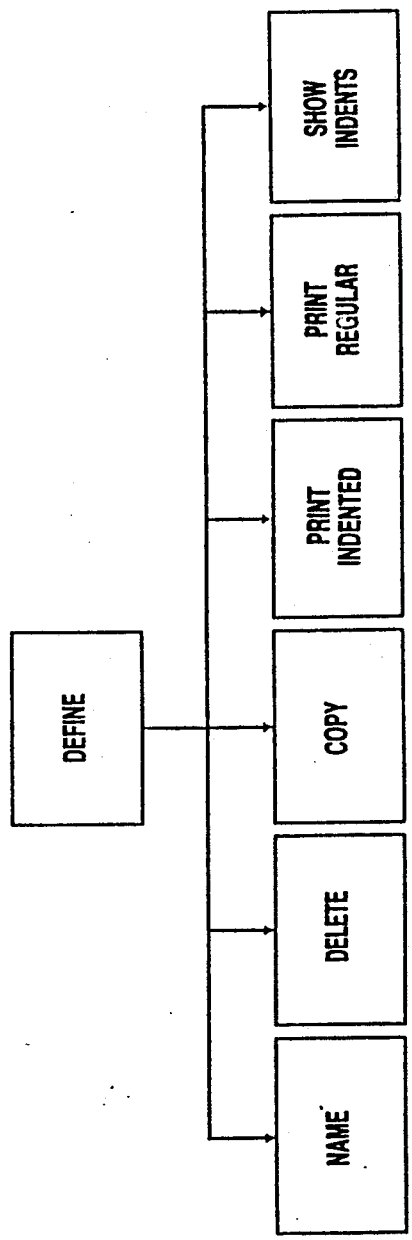

As shown in Table II, the Create function has six sub-functions. The Input Template and Hierarchy sub-functions are shown in FIGS. 3A and 3B, the Dictionary sub-function in FIGS. 4 and 5, and the Cross_Integrity subfunction in FIGS. 6A and 6B.

In the case of the Input_Template sub-function, there are four sub-functions. LIST generates a list of all templates and DELETE will delete a template from the list. MODIFY is implemented in similar fashion as ADD and simply involves changing data that is already in the system. As shown in FIG. 3A and Tables IV and V, the ADD sub-subfunction generates the displays shown in Tables IV and V and reads the data entered by the user. It tests any SEPT values that have been entered to determine if they are specified in a Dictionary. If not it enters the Dictionary subfunction. If the SEPT values are in the Dictionary, the program proceeds to read and store the remaining template data.

The Hierarchy subfunction provides the sub-subfunctions of Define, Roll-up, Options and Integrity. The Define function establishes the hierarchal relationship between the entities. Illustratively, this is accomplished by setting a pointer from a entity in one level of the hierarchy to an entity or entities in the next higher (or lower) level of the hierarchy. FIG. 3B illustrates the options available for defining a hierarchy. The system allows the user to name a new hierarchy, delete an existing hierarch, copy an existing hierarchy to a new hierarchy, print a listing o the hierarchies in different formats. In addition, the define function enables the user to specify how much of the entity is owned by the entity in the next higher level of the hierarchy.

The Options function permits the user to select for batch or on-line consolidation. To permit on-line consolidation, changes in data values associated with a business entity are recorded as the difference between the original data value and the changed data value. This recorded difference is then used to update the corresponding data value in the next higher level of the hierarchy and so on. As a result the task of updating a consolidation at any point in a hierarchy is merely a matter of checking a file for recorded differences in data values for the detailed entities reporting to that point and adding any difference to the corresponding date value. Since it is not necessary to recalculate the entire consolidation, this can be done by the computer in an "on-line" mode between the time the change is entered in the data value for the detailed entity and the time the user can call for a display showing the consolidation of this change.

Figure 4:
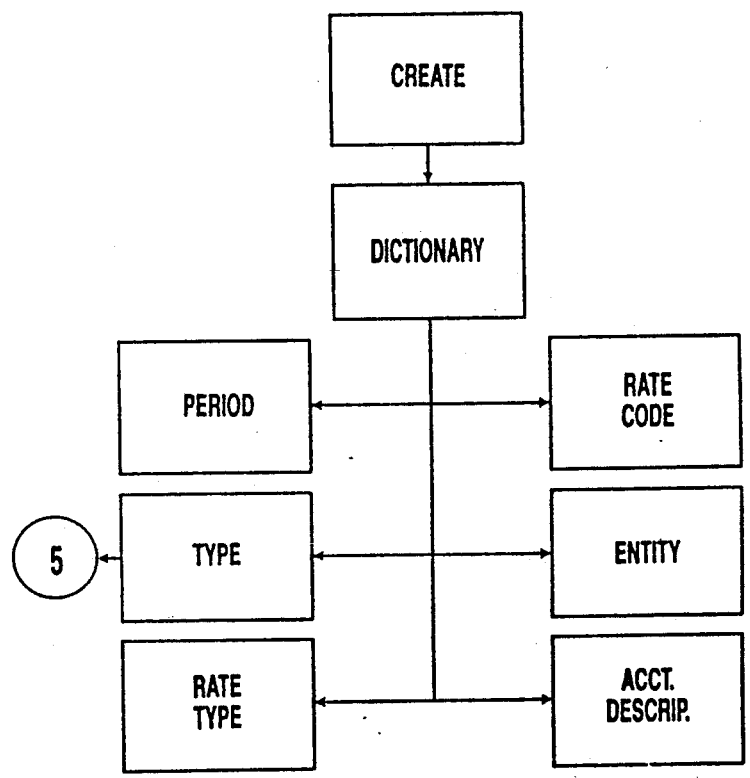

The Dictionary sub-function provides for the creation and maintenance of the six dictionaries as shown in FIG. 4. These dictionaries are essentially tables. Period, Type and Entity are lists of valid periods, types and entities for which data can be entered. Rate Code and Rate Type specify currencies used and conversion rules.

Figure 5:
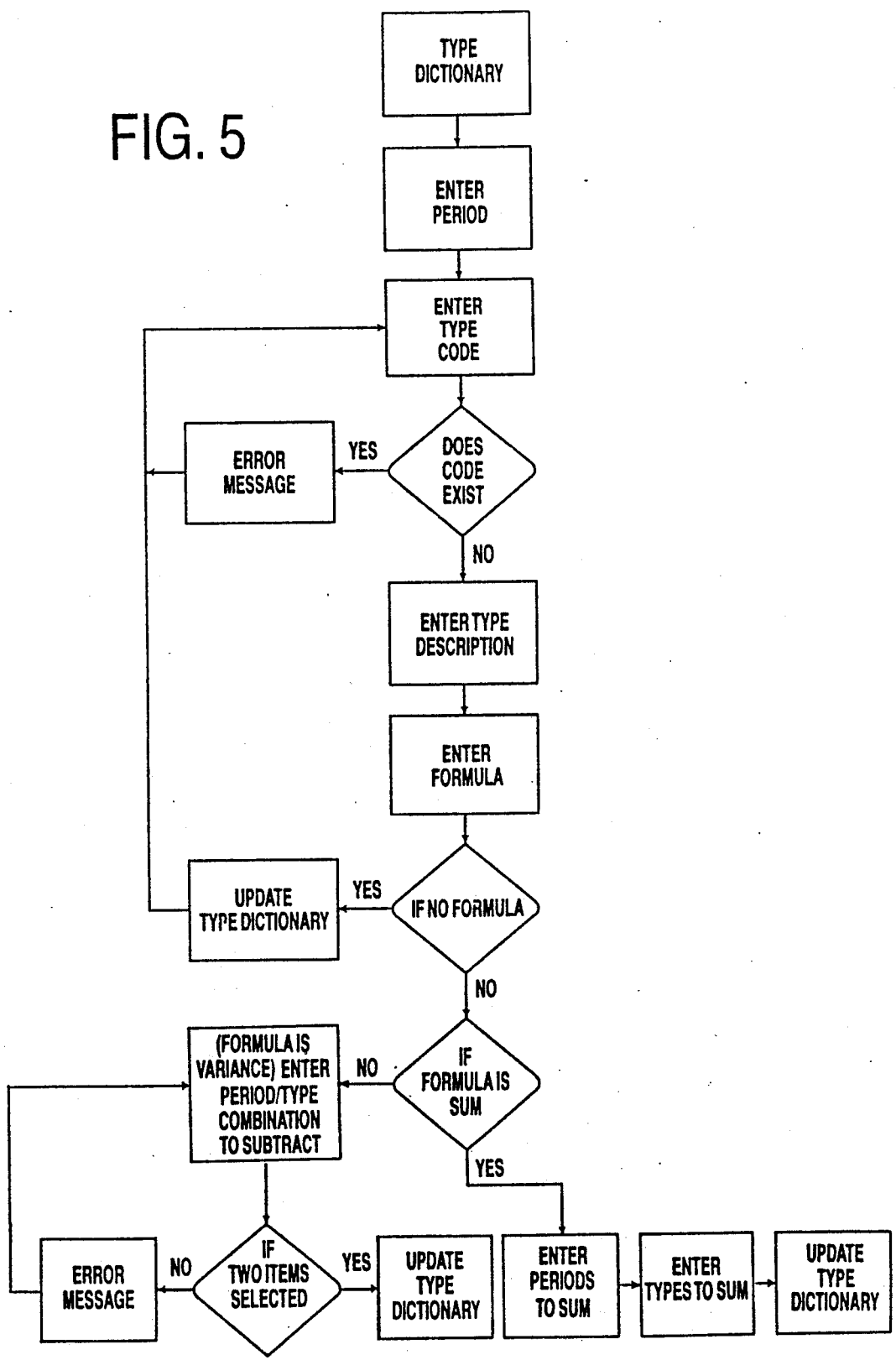

As shown in FIG. 5, the TYPE DICTIONARY lets the user specify the types of financial data used by a company. The usual entries are Actual, Budget, and Forecast, but the user can specify any entry that meets his needs. The user enters the Type Code, such as type code equals ACTUAL. The system will then determine if the code exists. If the code does exist and the user is attempting to add this code, the system will display an error message. If the code does not exist, the system allows the user to enter a type description, such as ACTUAL DATA and a formula. The formula allows the system to perform summations or variance calculations based on the TYPE so that besides specifying Actual, Budget or Forecast data the system can also display such information as the Variance between budget and actual data in a time period.

Figure 6A:
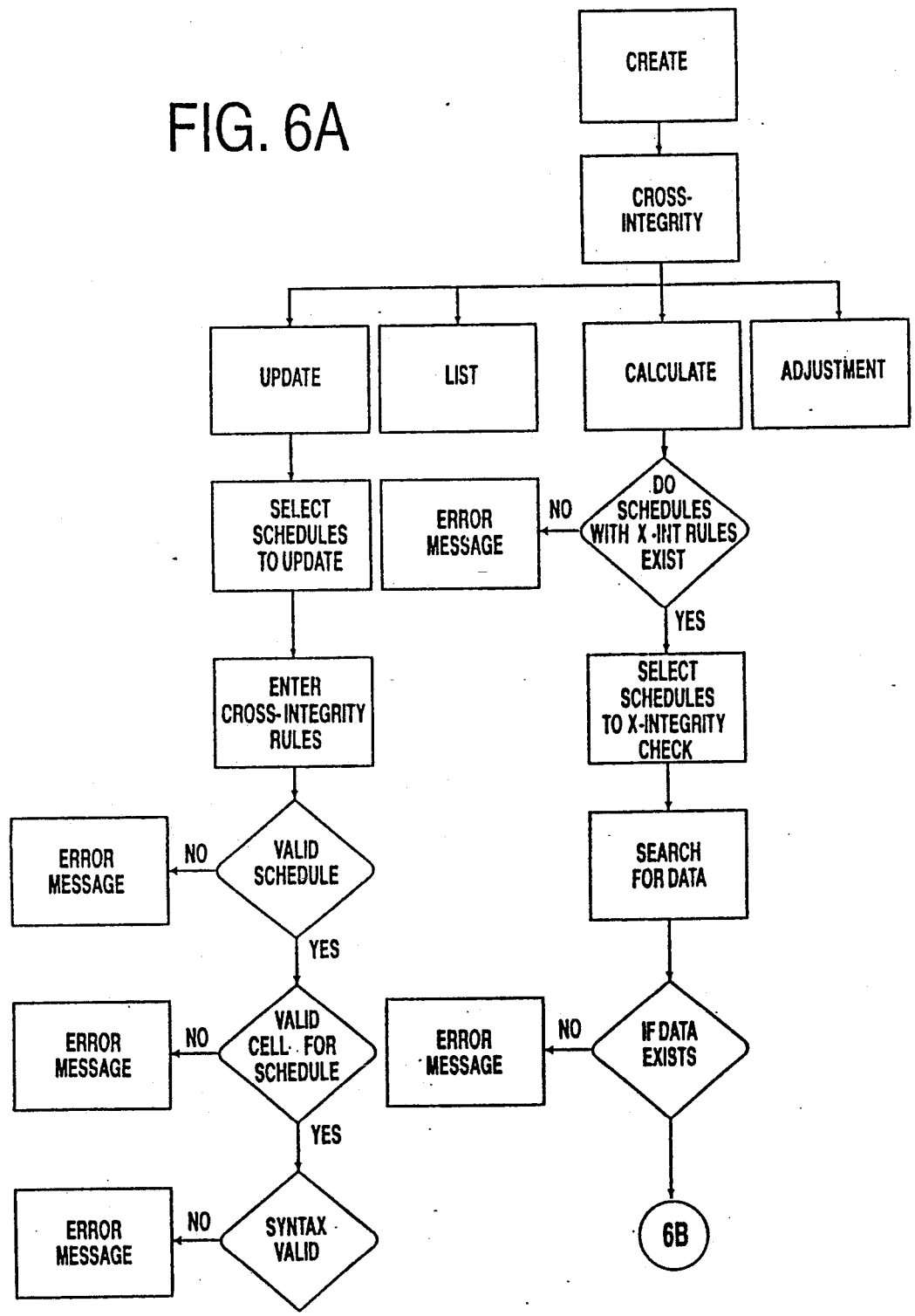
Figure 6B:
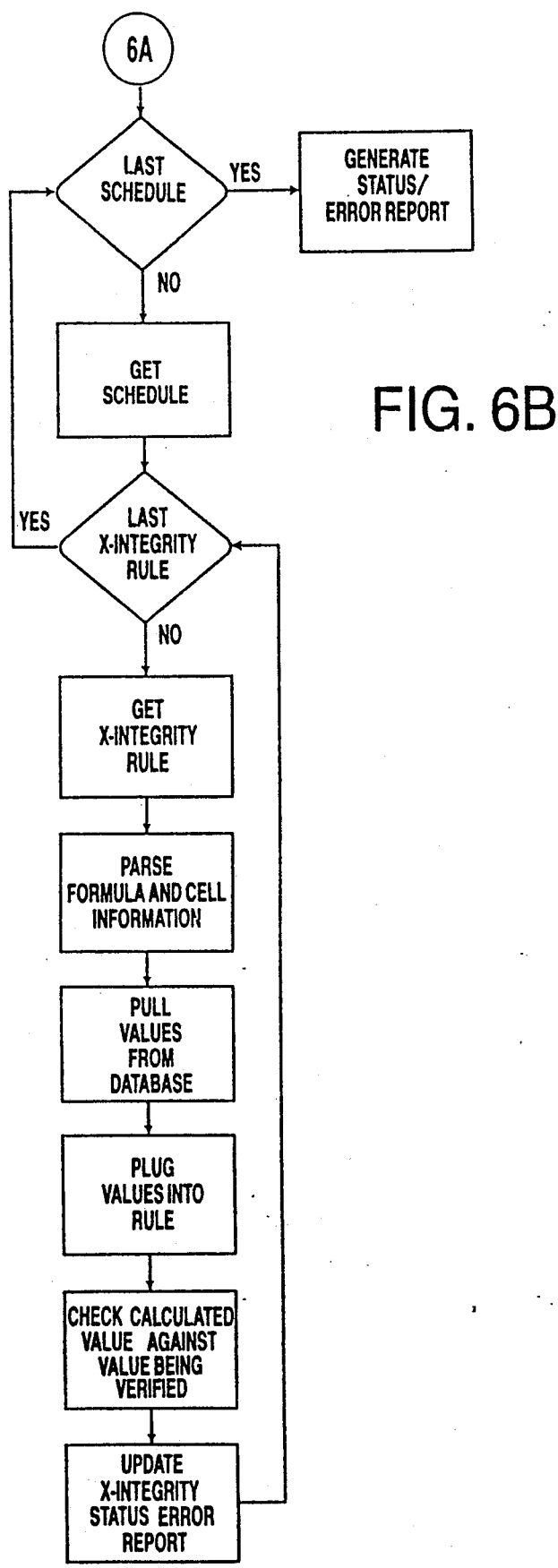

The Cross_Integrity subfunction provides the sub-subfunctions of Update, List, Calculate and Adjustment shown in FIG. 6A. The Calculate function searches for schedules and data to be checked. If these are located, it applies each cross-integrity rule in turn to values obtained from the database. A calculated value is thereby obtained which is compared with the value being verified. If the values compare, the rule is satisfied. Otherwise an error report is generated.

Figure 9:
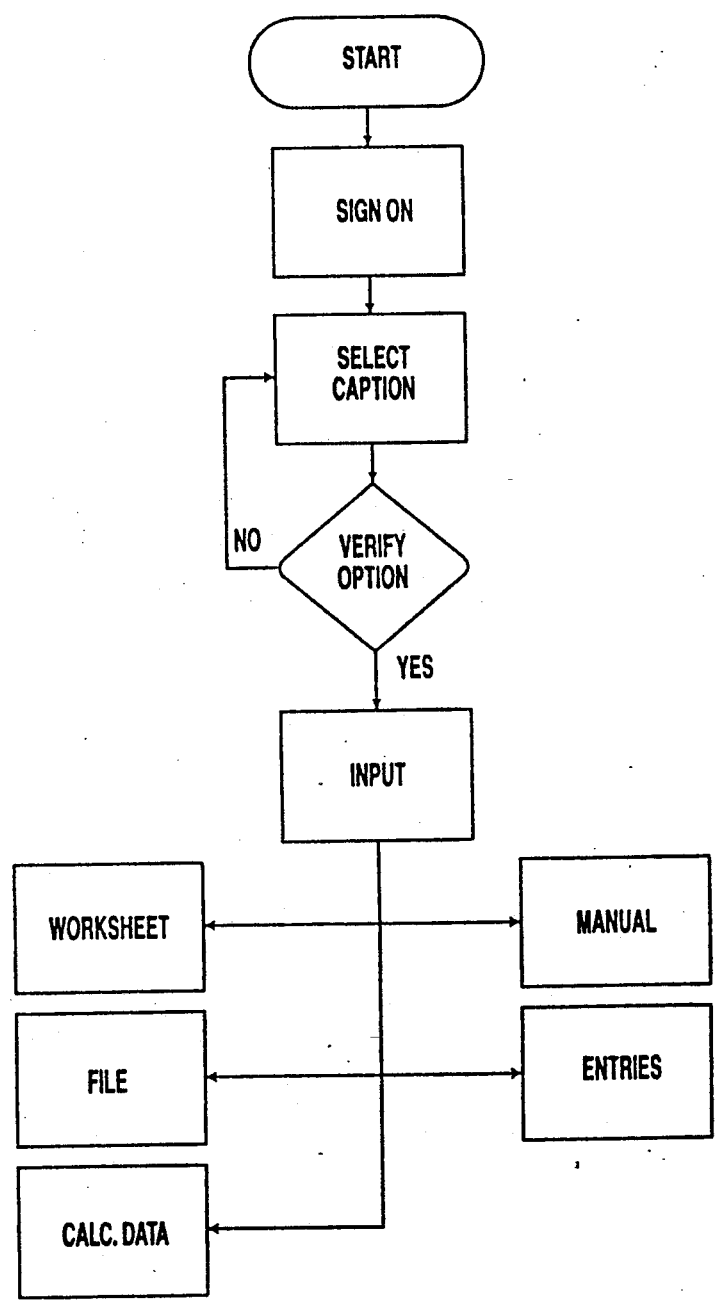
Figure 10:
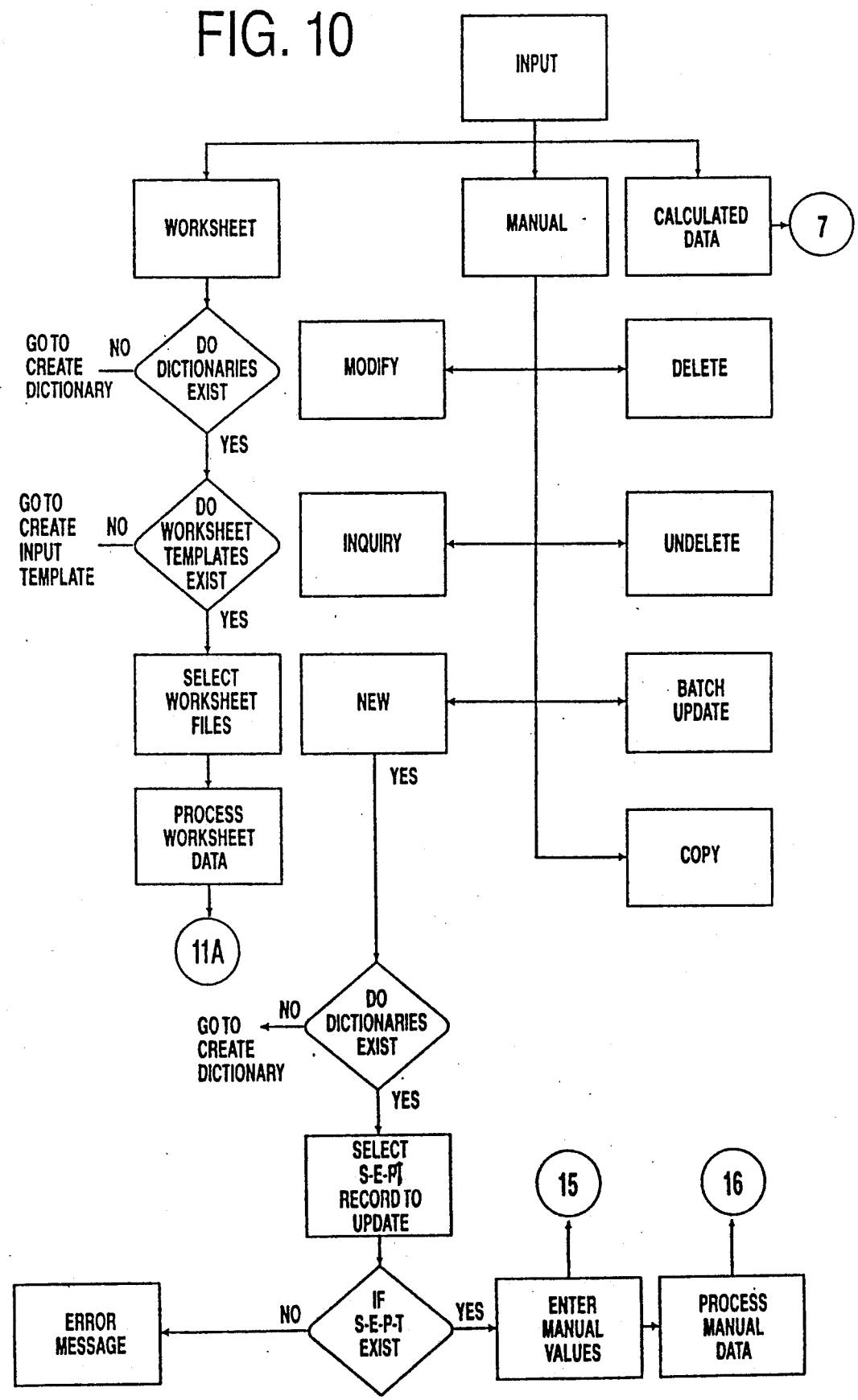

As shown in FIG. 9 and Table VI, the Input function has five sub-functions: Worksheet, Manual, File, Entries and Calculated_Data. If the Worksheet sub-function is selected, as shown in FIG. 10 the program tests any SEPT values that are entered against the dictionaries to determine if they are valid and also tests if there are any input templates for the SEPT values specified. If there are no dictionary values the program displays an error message and allows the return to the Create/Dictionary function; and if there are no templates, the program return provides an error message and allows the user to the Create/Input_Template function. If the SEPT values are valid and there is at least one input_template available, the list of available templates is displayed and the user selects one of these templates for input from the worksheet. On instruction from the user, the program then processes the data on an input worksheet, reading it into the system database in accordance with the mapping specified in the input template.

Figure 11A:
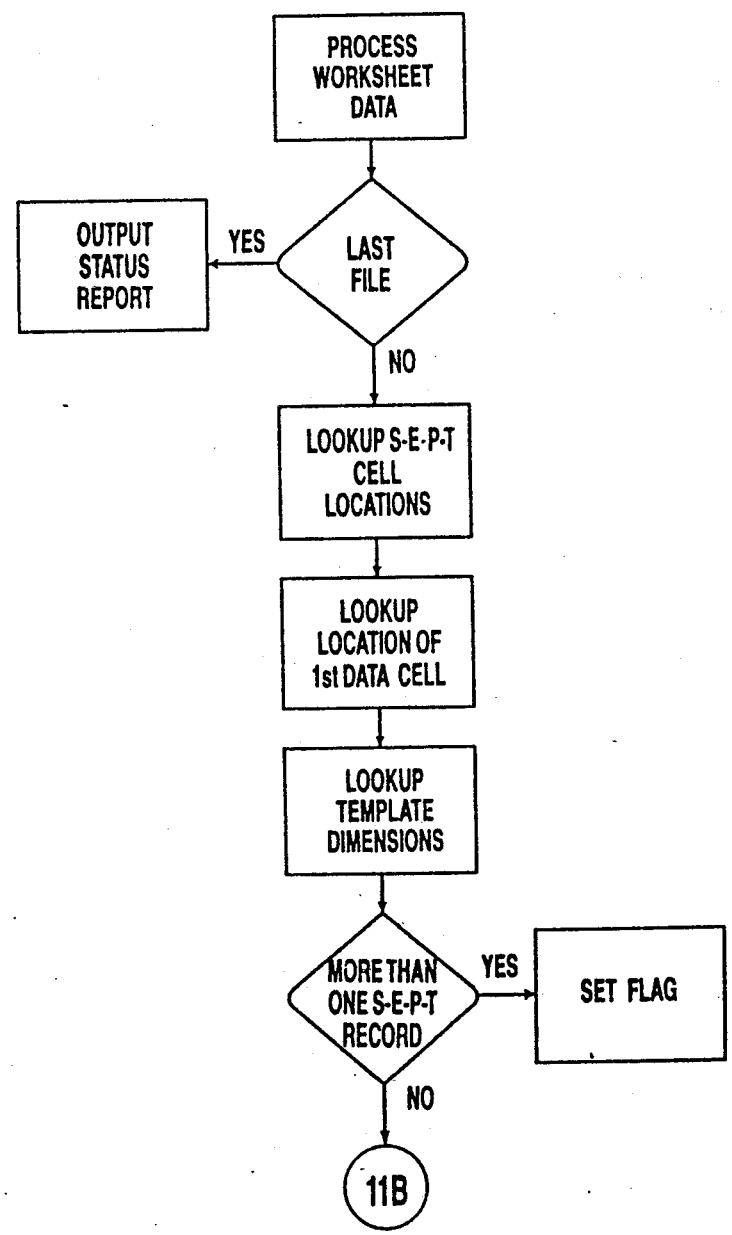
Figure 11B:
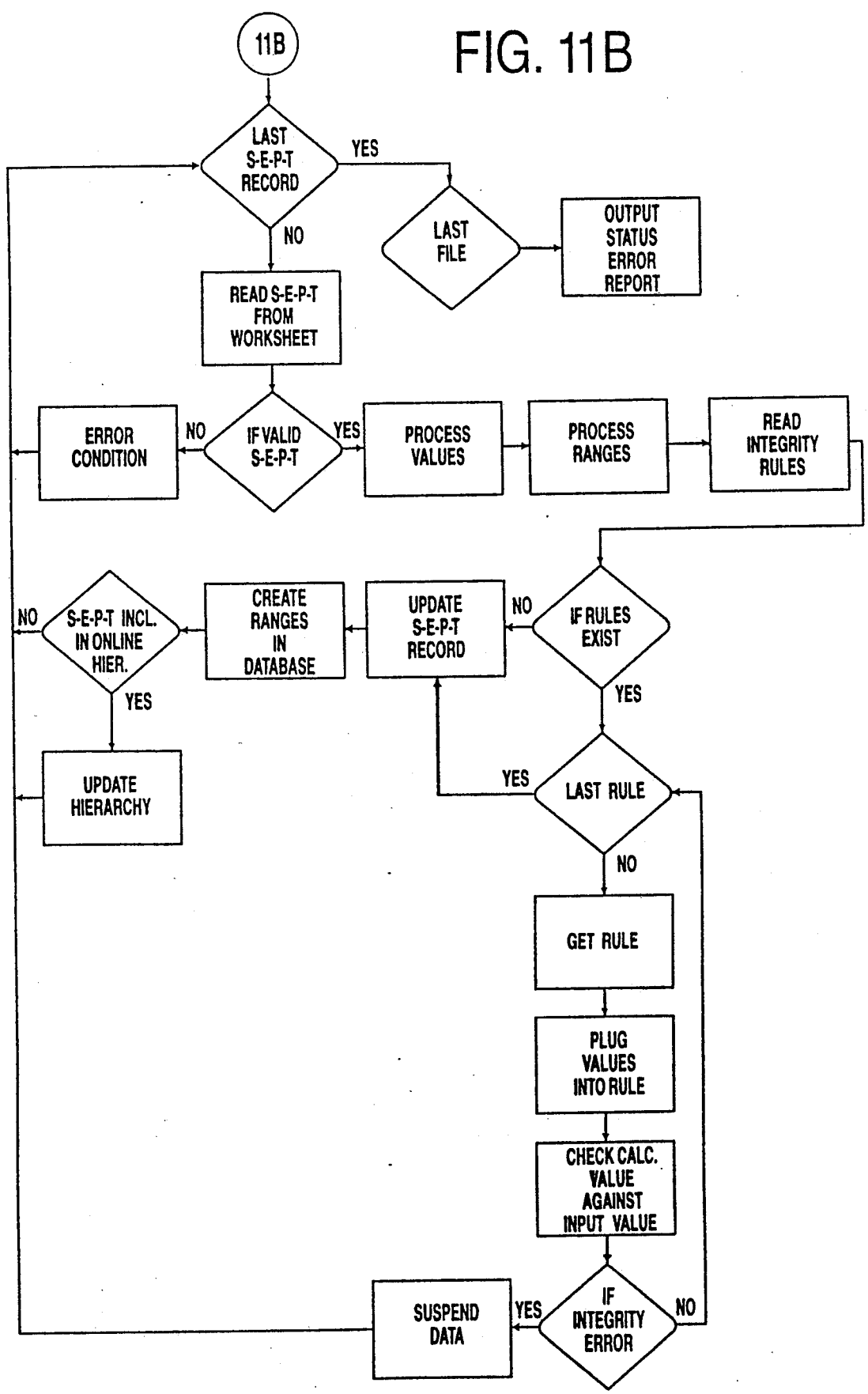

As shown in FIGS. 11A and 11B, in processing the worksheet data the program looks up the location in the system data store of the SEPT value for the worksheet being processed; and it determines the location of the first data cell of the worksheet from the information stored in the input template for that worksheet.

If there is more than one record for a particular schedule, entity, period, type the system is flagged so that it will know to place the next row or column in a different SEPT. If there is only one SEPT record, the record is read and checked to make sure that the SEPT is valid (i.e. the Schedule, Entity, Period and Type are stored in the data base) as shown in FIG. 11B. If the SEPT is valid, the values and/or ranges are read in through the template. If integrity rules exist the data is checked against the rules for validity. If there is an error the data input is suspended so that the user can make corrections. If no errors, the process will continue until the last rule is read. The data base is then updated. If the record is attached to a hierarchy, all entities which are attached are also updated by creating a record of the difference between the old and new data values.

Figure 12:
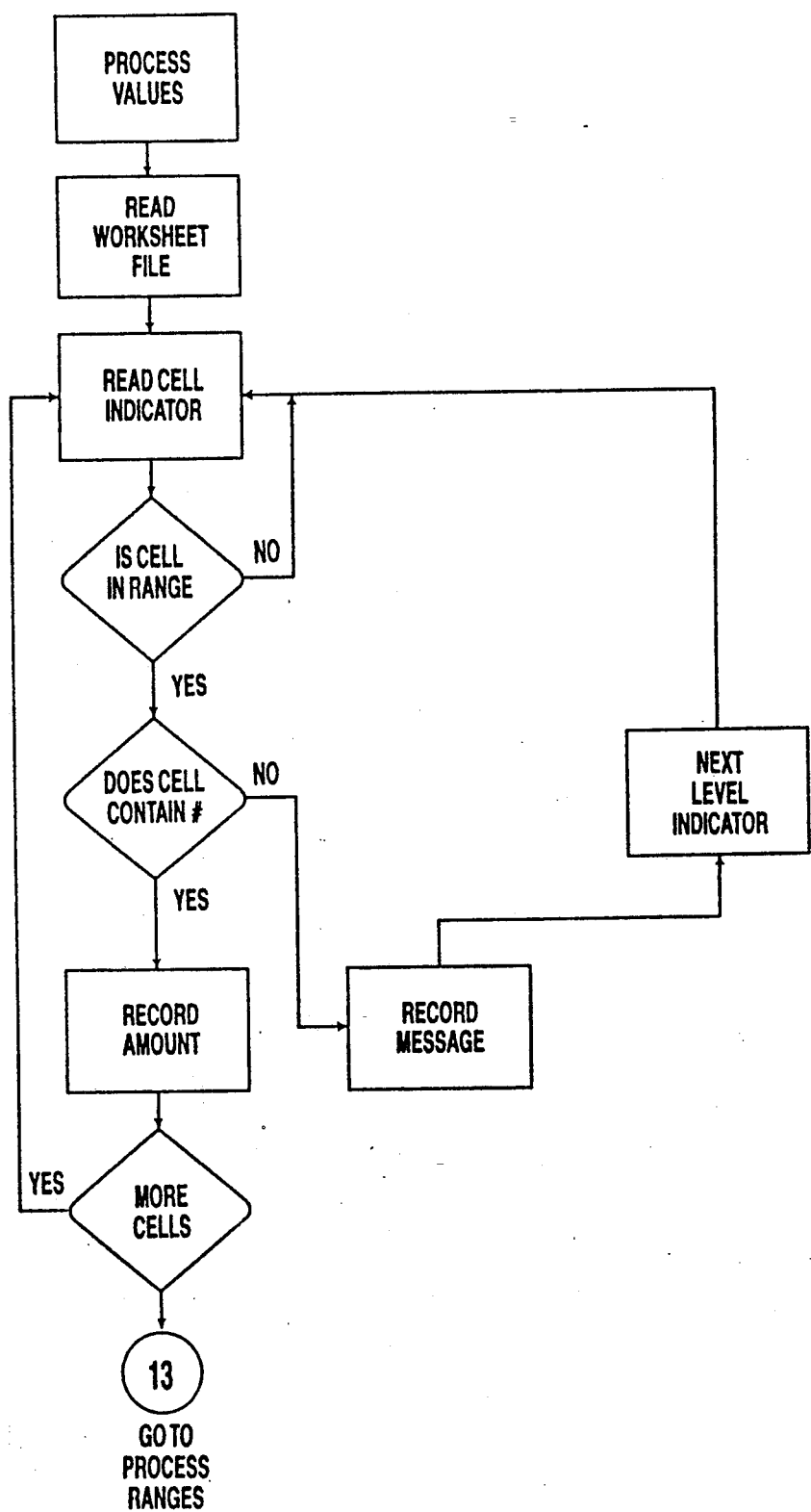

As shown in FIG. 12 in reading in the data, the system determines if each data input cell is identified by a range such as Sales. If the cell is in a range, the system then checks to see if the cell contains a value and if so reads in the value and places it in a specified place in the data base for that range. The system will continue to read in the records and check for ranges until it reaches the end of file. If the output cell does not contain an amount, the system will generate an error message and continue to read the remaining cells as shown in FIG. 12.

Figure 13:
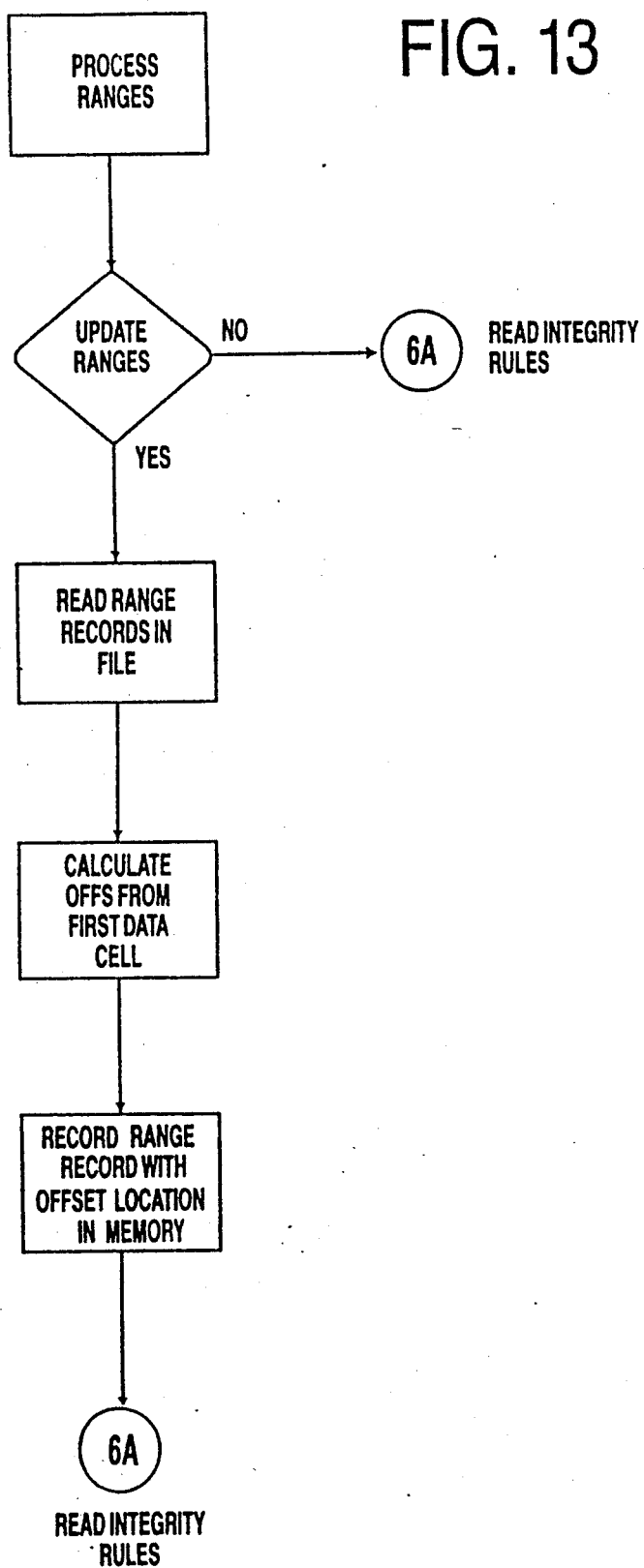

As shown in FIG. 13, the cells identified by the process of FIG. 12 are then located with respect to the first data cell associated with a particular SEPT value. For each cell, an offset is calculated between the cell location and the location of the first data cell and that offset is recorded along with the range record so that the data associated with the range value can later be located.

Figure 14:
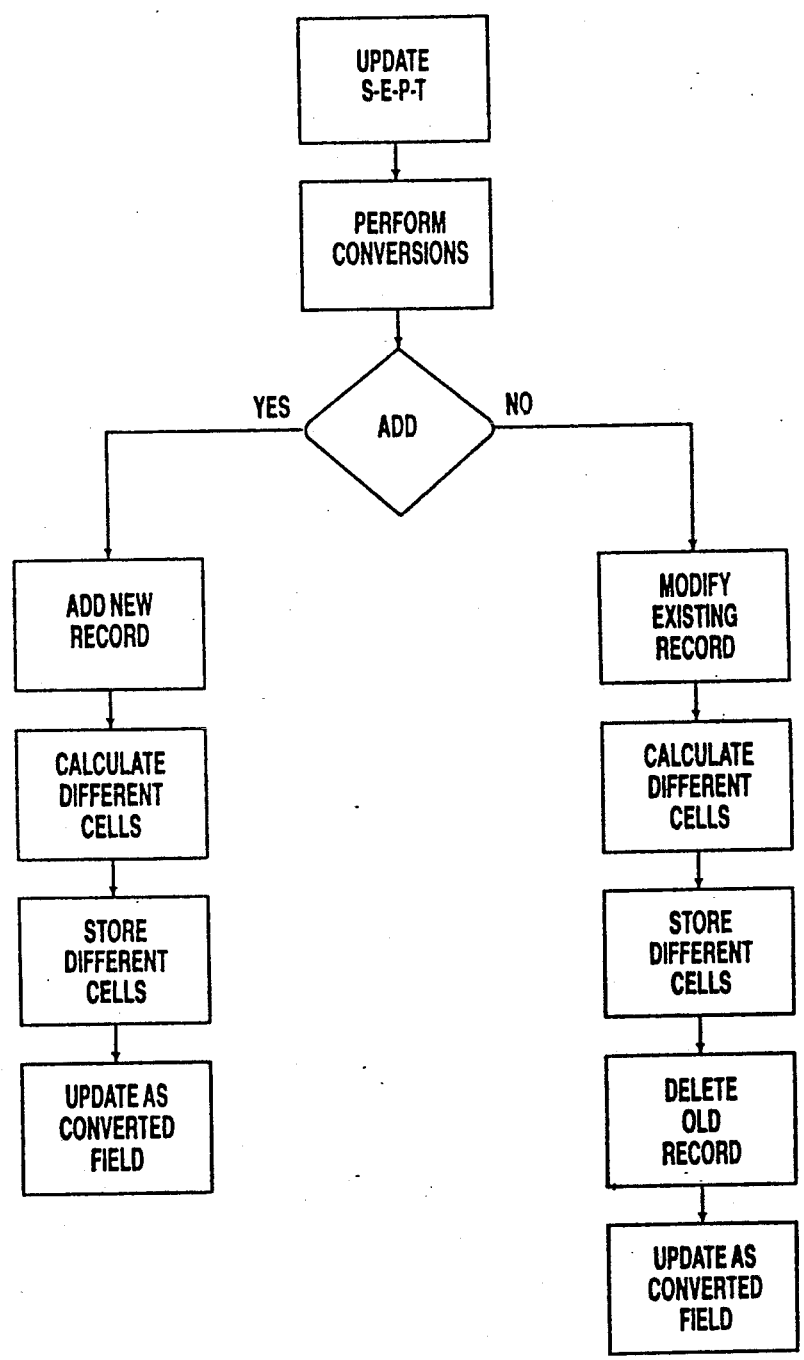

FIG. 14 illustrates the process involved when inputting data containing integrity rules. If rules exist the corresponding S-E-P-T is updated either by adding new rules or by modifying existing rules.

Figure 15:
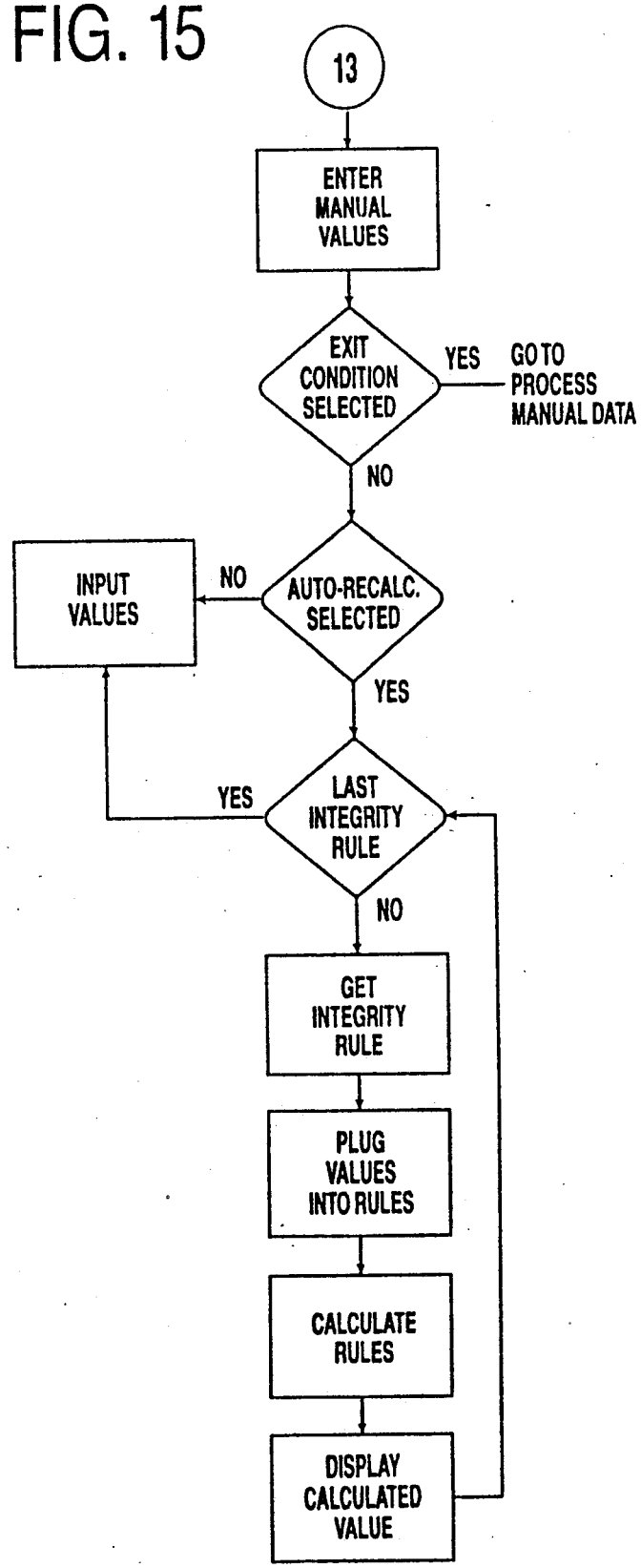

FIGS. 10 and 15 illustrate the process of keyboard entry. The existence of the SEPT values in the dictionaries is tested and a particular SEPT value is selected for data input. As the data is input, it is checked for integrity using the input template integrity rules. If the data fails the integrity check, the system allows the user to abort, correct the data, or save the data "as is". When data is corrected, the system will automatically recalculate the result of the new input, again following the integrity rules. The user can chose not to recalculate the data as shown in FIG. 15.

Figure 16:
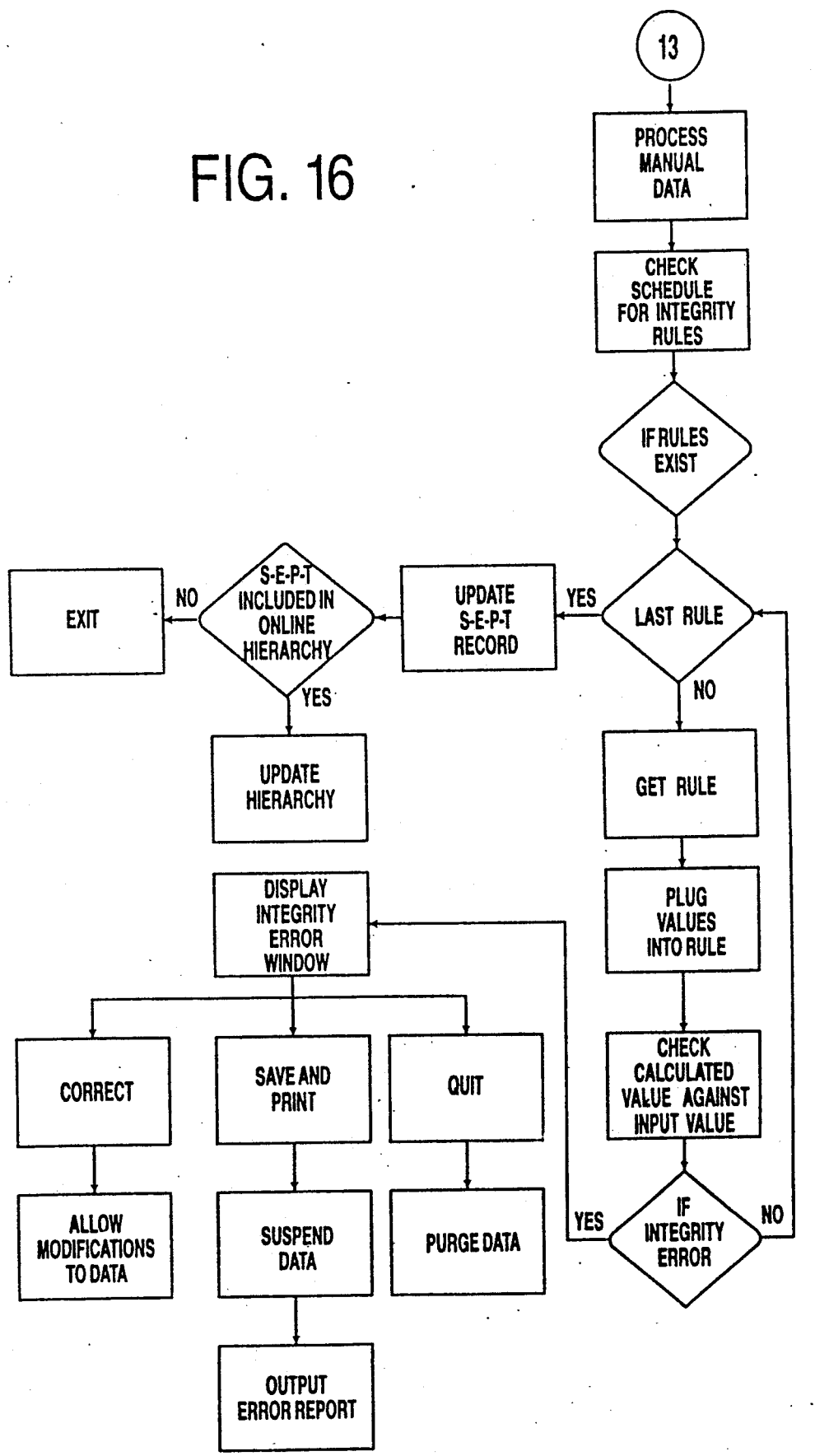

FIG. 16 illustrates the processing of data entered via a keyboard. The system checks the input data cell by cell against the integrity rules. If no errors, the data is stored in the data base and any records that are attached to the updated record are also updated as shown in FIG. 14. If there are errors, an error message will appear at which point the user can correct the data, save the data "as is" and print an error report or abort the update and purge the data.

Figure 17:
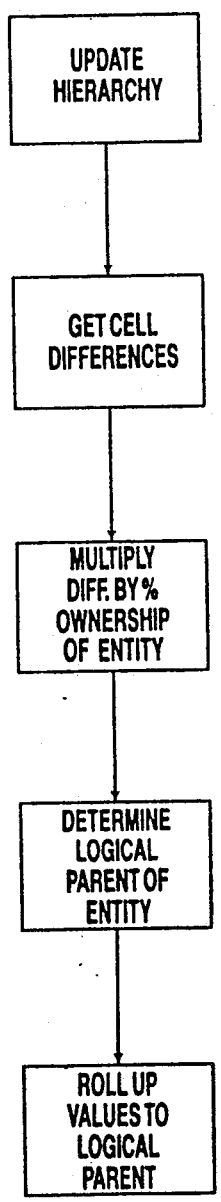

FIG. 17 illustrates the process for updating a hierarchy. After the data input has been accepted through the template as shown in FIG. 11B or FIG. 16, the system determines the difference between the old datacell value and the new datacell value. It then multiplies this difference by the percentage ownership the parent entity has and provides the result to the parent to combine with the corresponding value in the parent's consolidation.

Figure 7:
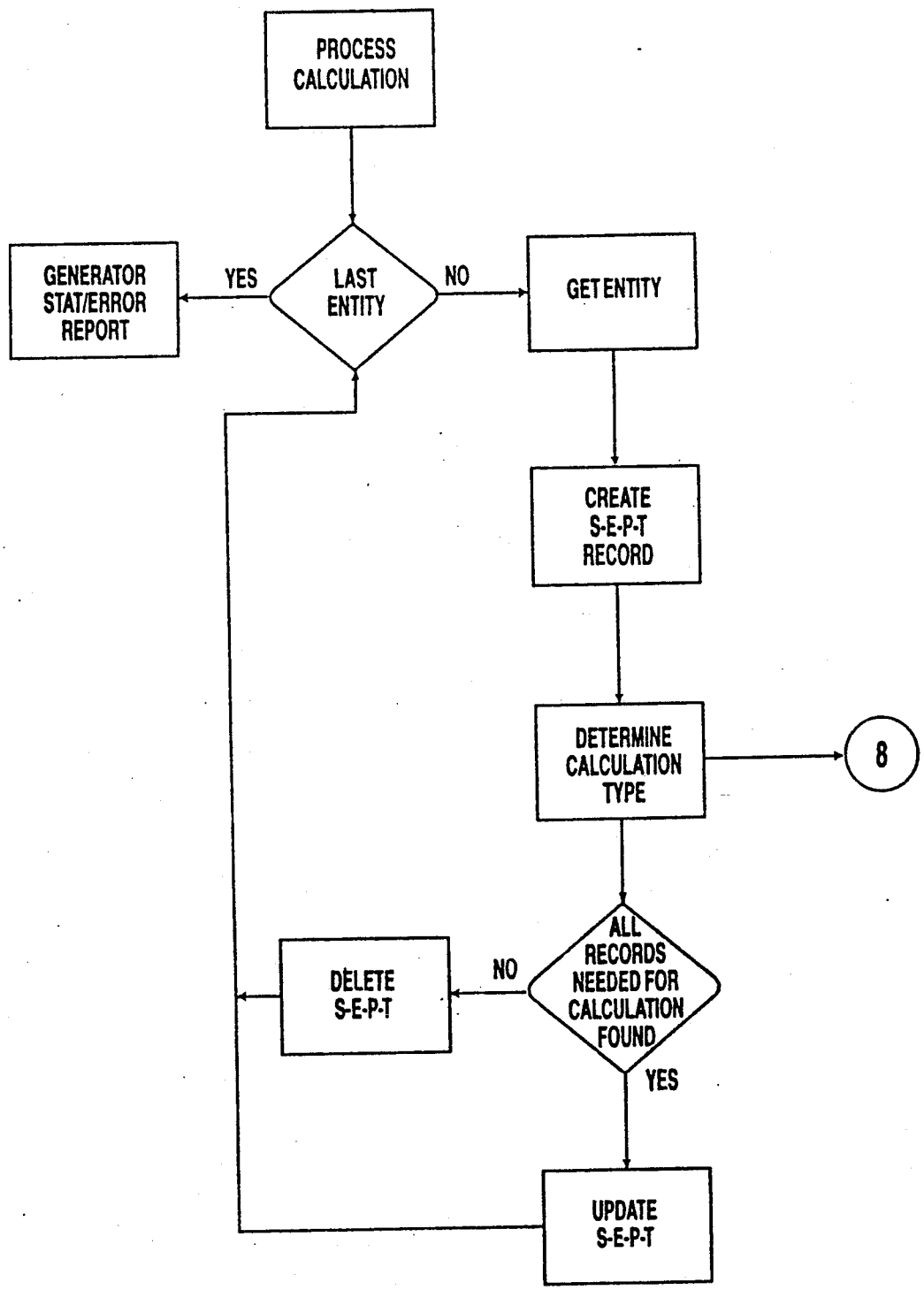
FIGS. 7-18 are flowcharts depicting the implementation of the Input function of the present invention.
Figure 8:
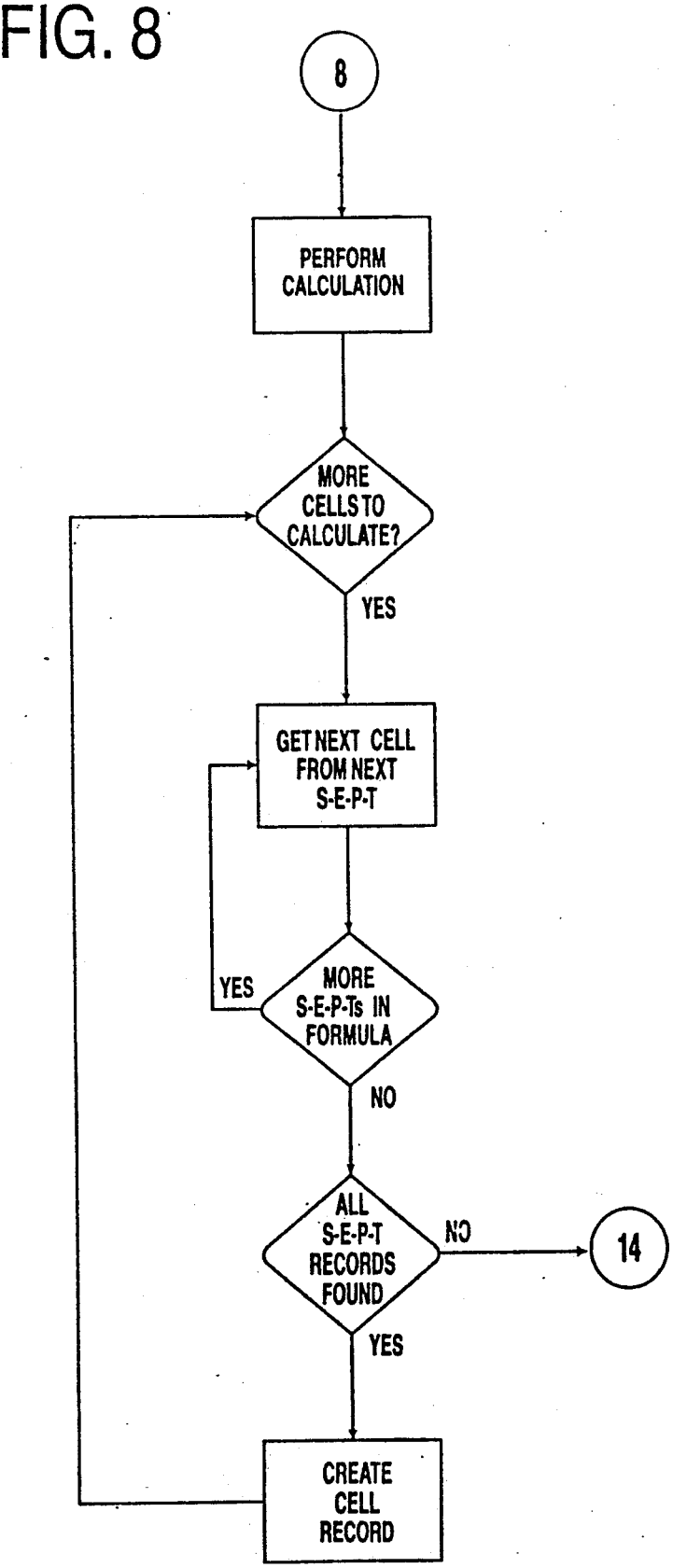
Figure 18:
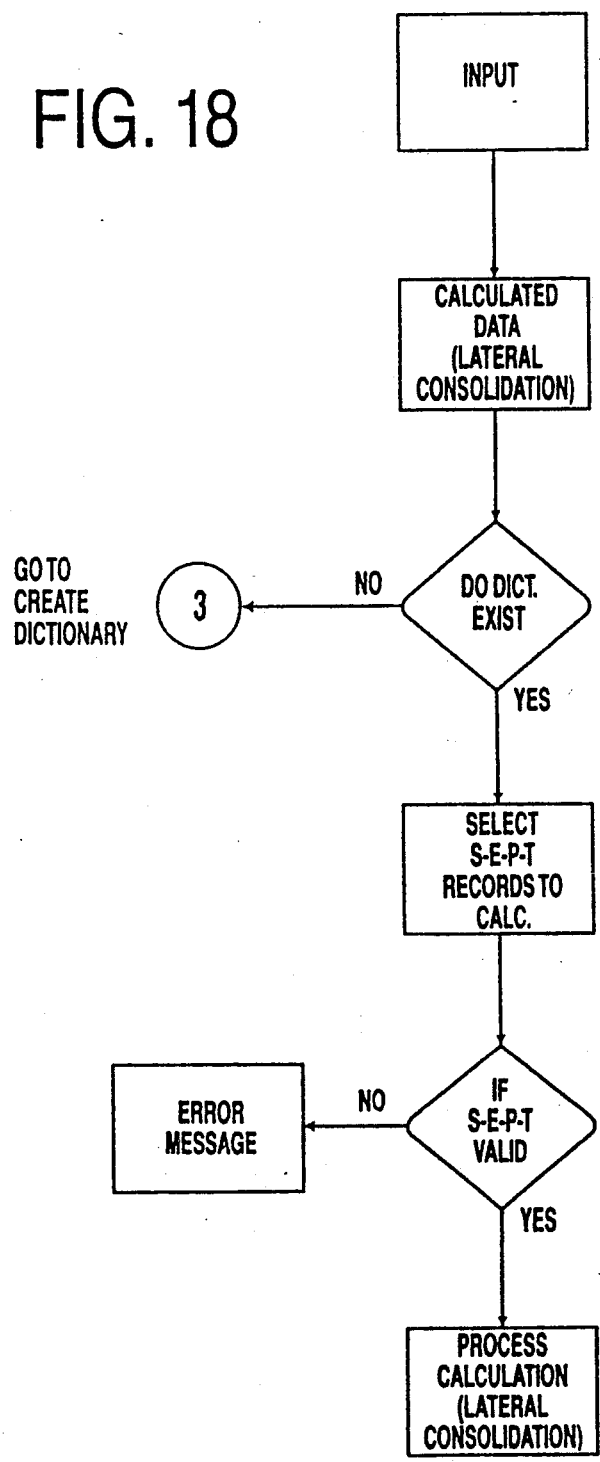

FIGS. 18, 7 and 8 depict the processing of calculations, for example, as part of the input of calculated data in FIG. 10. This is used to consolidate data laterally by period or type, for example, to product year-to-date data by summing each month's data to the preceding year-to-date data. To accomplish this the program must create a new SEPT record for the new data, determine the type of calculation to be performed, locate the data required for the calculation in whatever cells it may be, and perform the required calculation.

Figure 20:
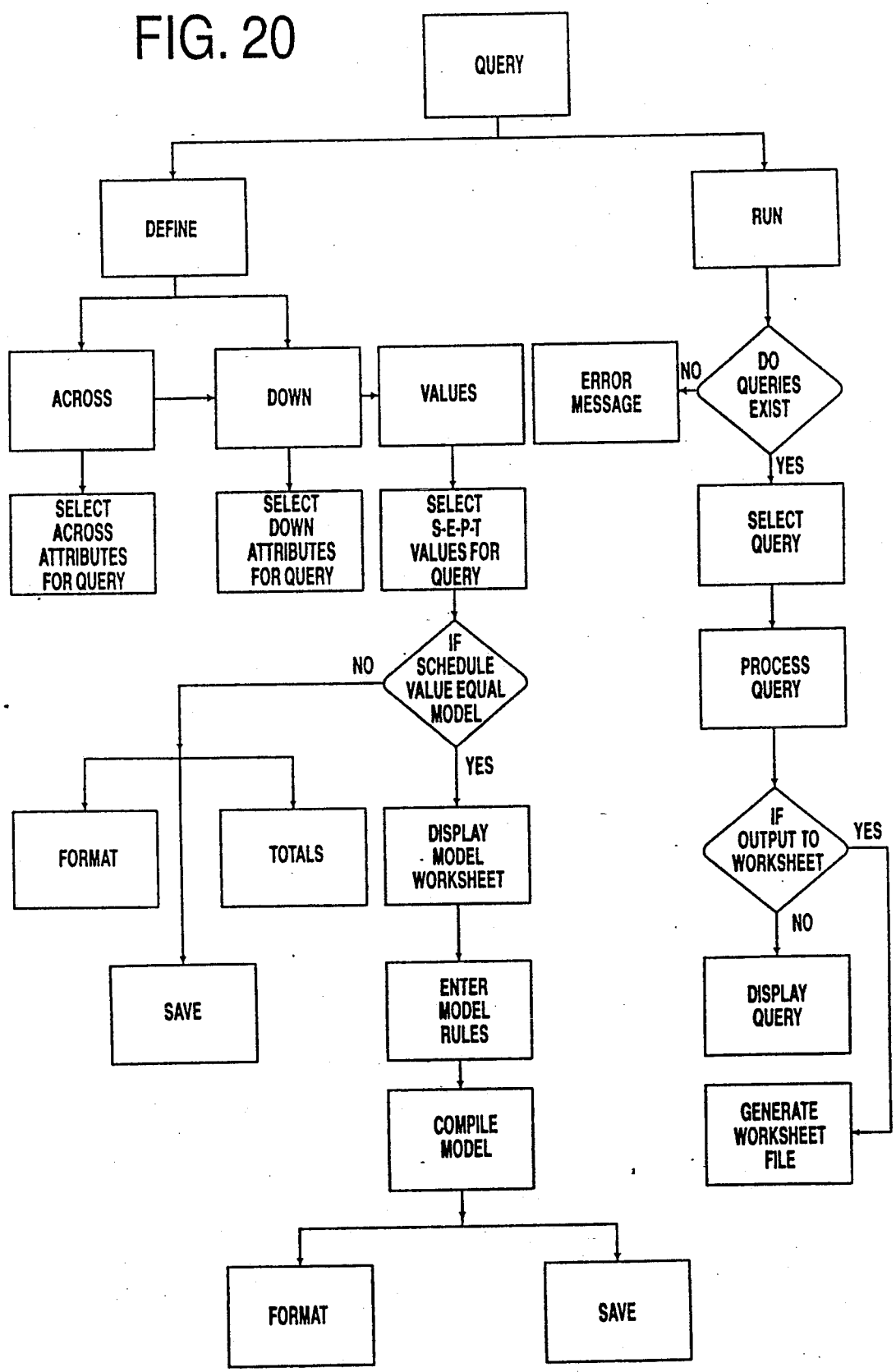

FIG. 20 and Tables VII–XIII illustrates the process for defining and running a query.

Figure 21:
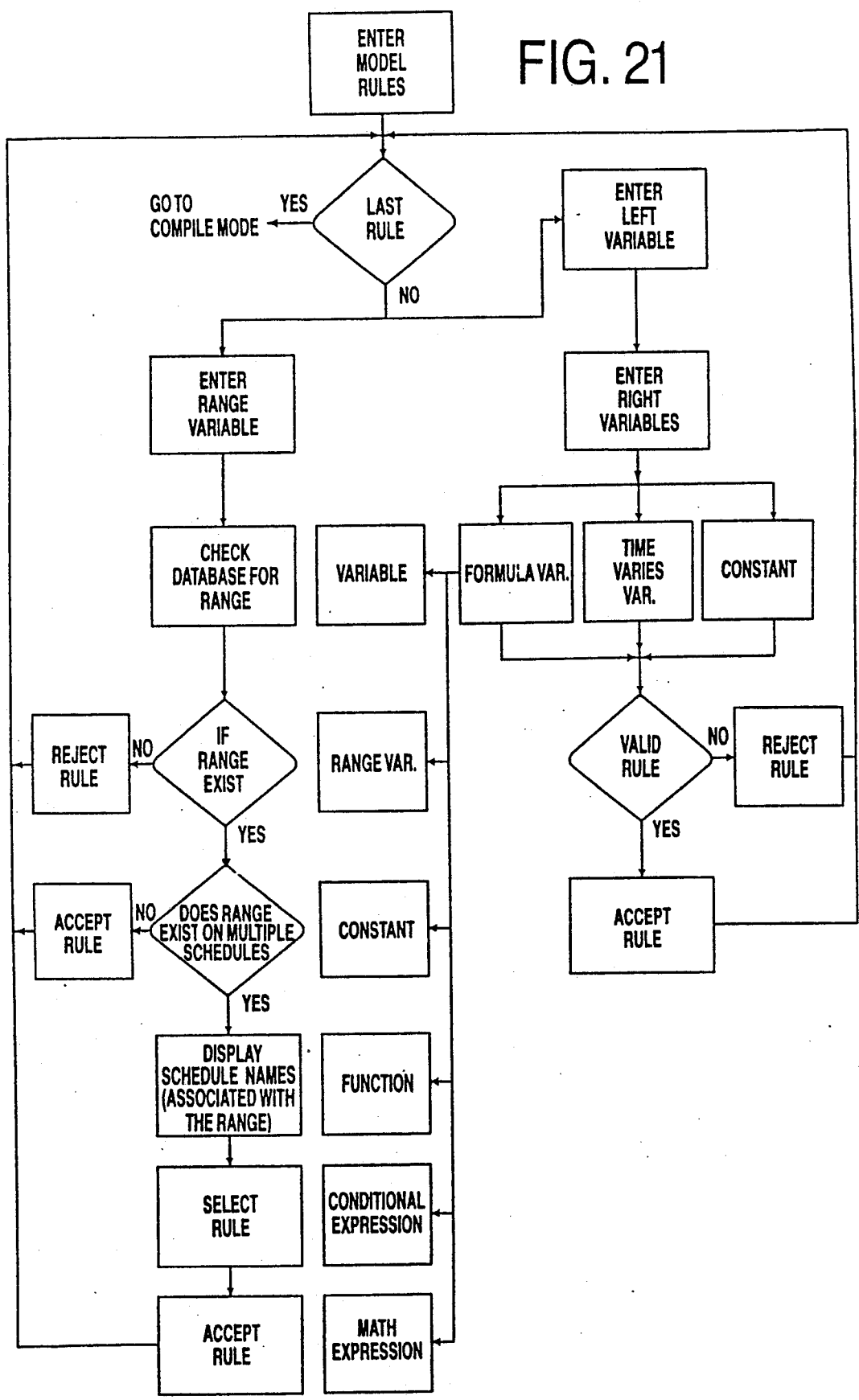

FIGS. 20 and 21 and Tables XX–XXII illustrate the process for defining a model.

Figure 19:
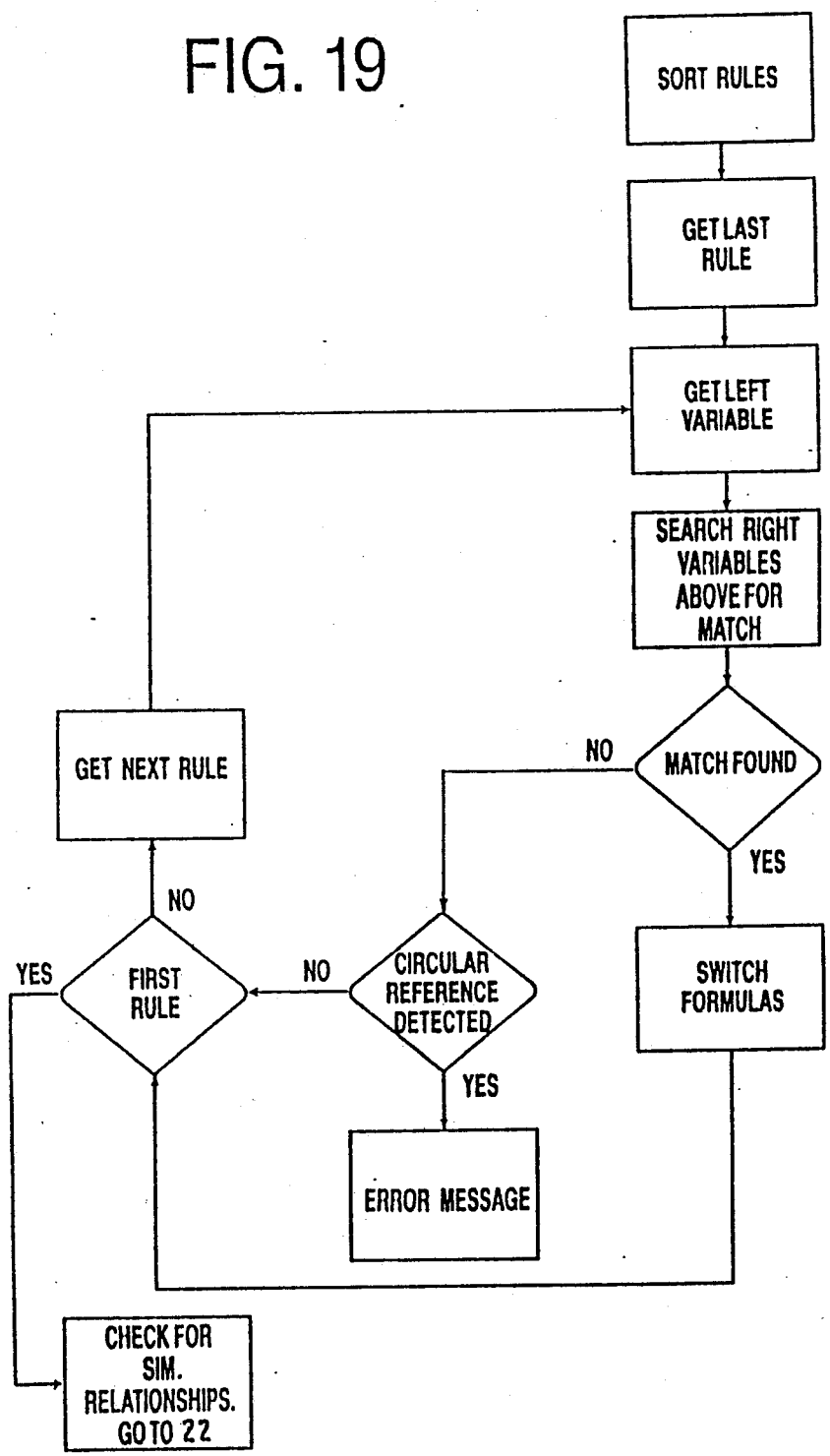
FIGS. 19-23 are flowcharts depicting the implementation of the Query function of the present invention.
Figure 22:
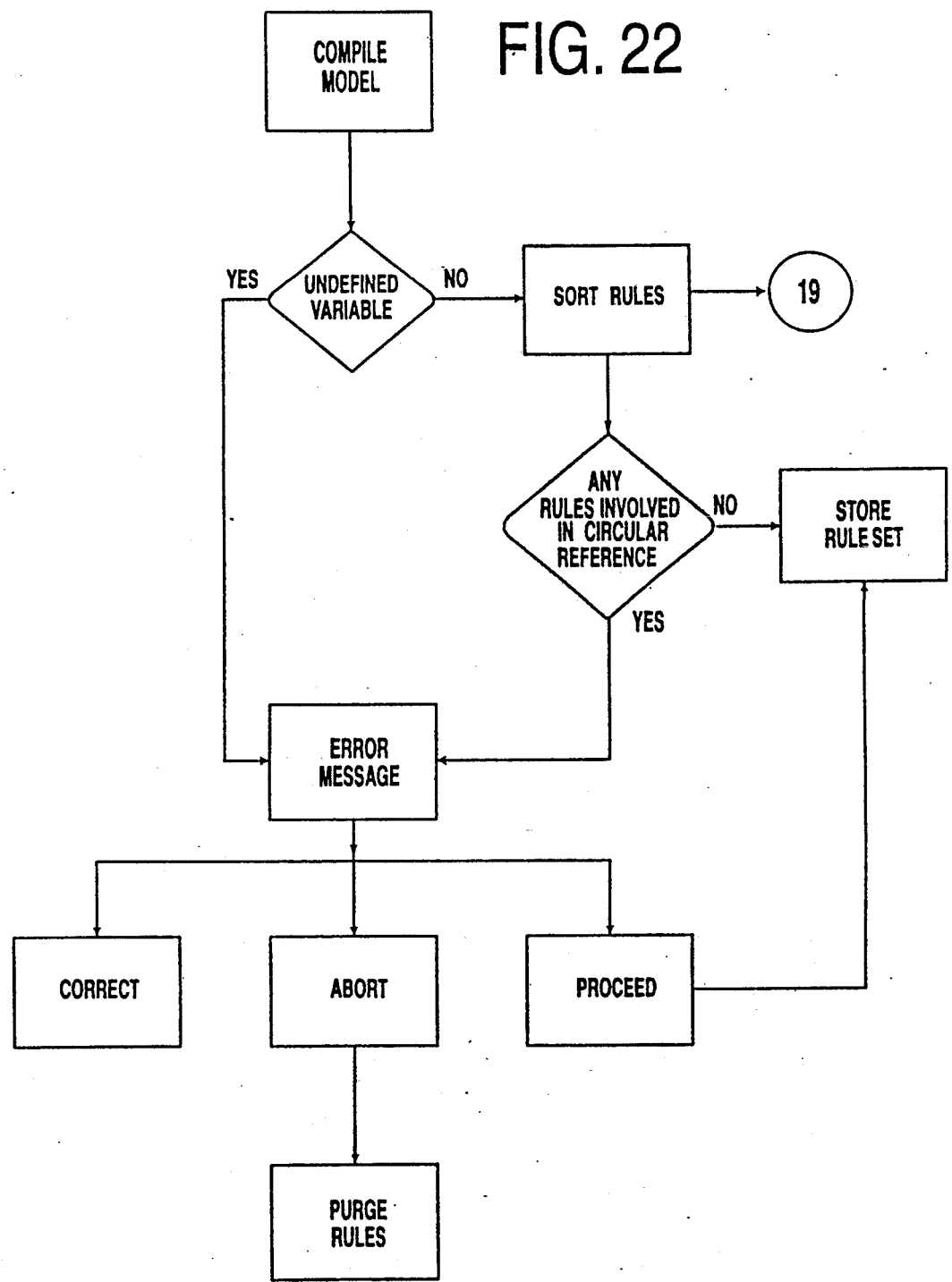

FIGS. 19 and 22 illustrates the process of compiling a model. FIG. 19 illustrates the process of sorting rules when compiling a model. Once it is determined that there are no undefined variables in the set of model rules, the system sorts the rules in execution sequence. This involves rearranging the rules in an order which ensures that any variable referenced in a rule is defined prior to the rule. To rearrange (sort) the rules, the system starts with the last rule. It reads the left variable of the last rule then searches the right variables of all the rules above for a match. A variable is a name the user specifies in a rule to represent a value or values. A left variable is to the left of an equal sign and a right variable is to the right of an equal sign. For example, RETURN ON SALES=NET_INC.IS1 SALES*100. If a match is found the rules are switched. If no match is found, the rule is in the proper execution sequence. The system then gets the next to the last rule and re starts the search process. The system continues to sort until the first rule is reached. At this point the rule set is sorted in execution sequence. During the sorting process, the system keeps track of any simultaneous relationships (circular references) detected.

In FIG. 22 the system checks to see if any of the rules contain a circular reference (i.e. an endless loop) which would cause the compilation to proceed without an end. If there is a compilation error, the system will generate an error message and allow the user to correct the error, abort or save the rules set for future use.

Figure 23:
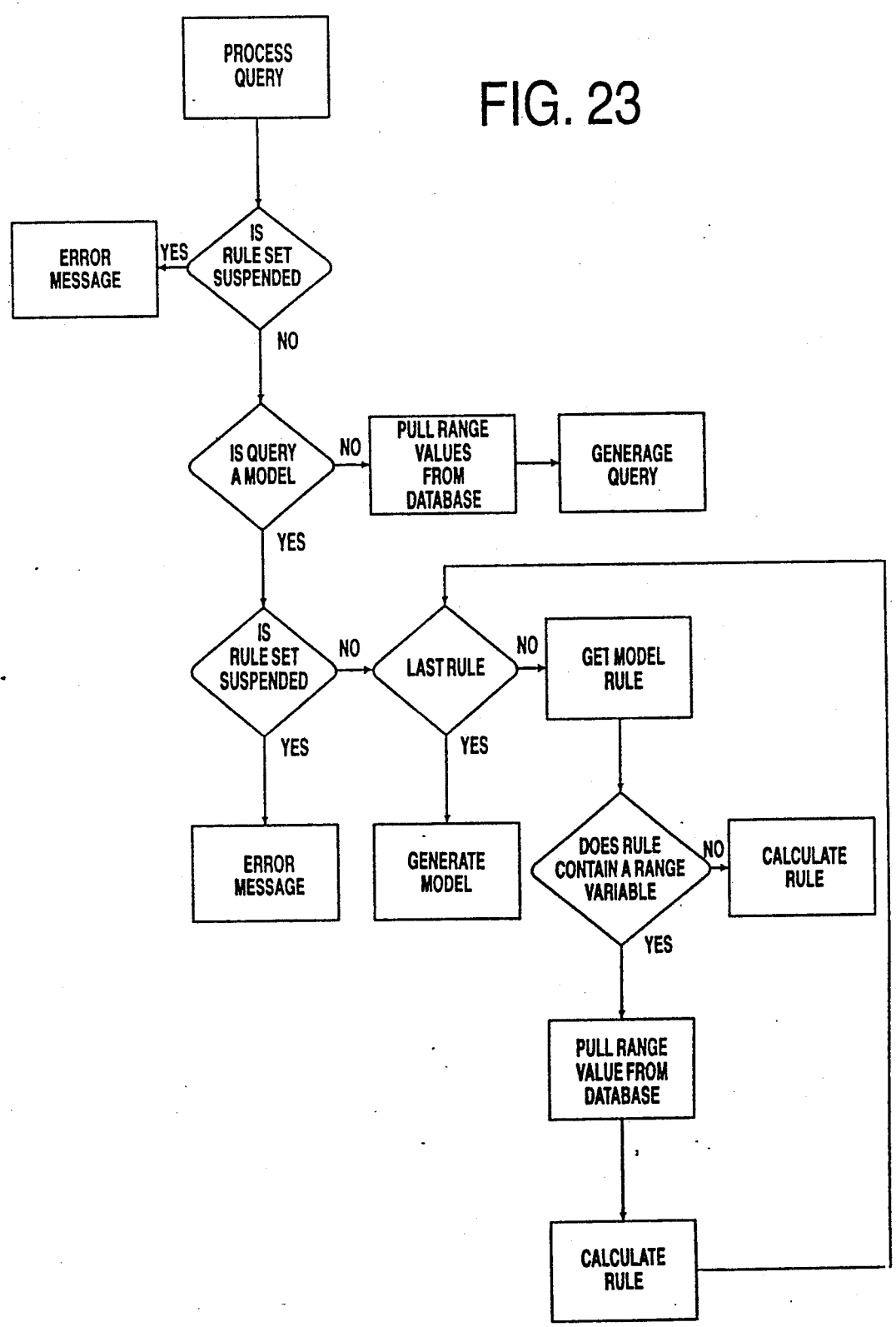

FIG. 23 illustrates the process of generating a query report or a model. If the query is not a model, the system will extract the requested values and generate a report. If the query is a model, it will check to see if on the last query there was an error which would cause the "rule set" to be suspended. If there were no errors and the process is on the last rule the system will generate a model. Otherwise, the system will check to see if the requested data contains a range variable at which time it will pull the requested ranges and calculate the rule. At the end of the file it will generate the model.

Figure 24:
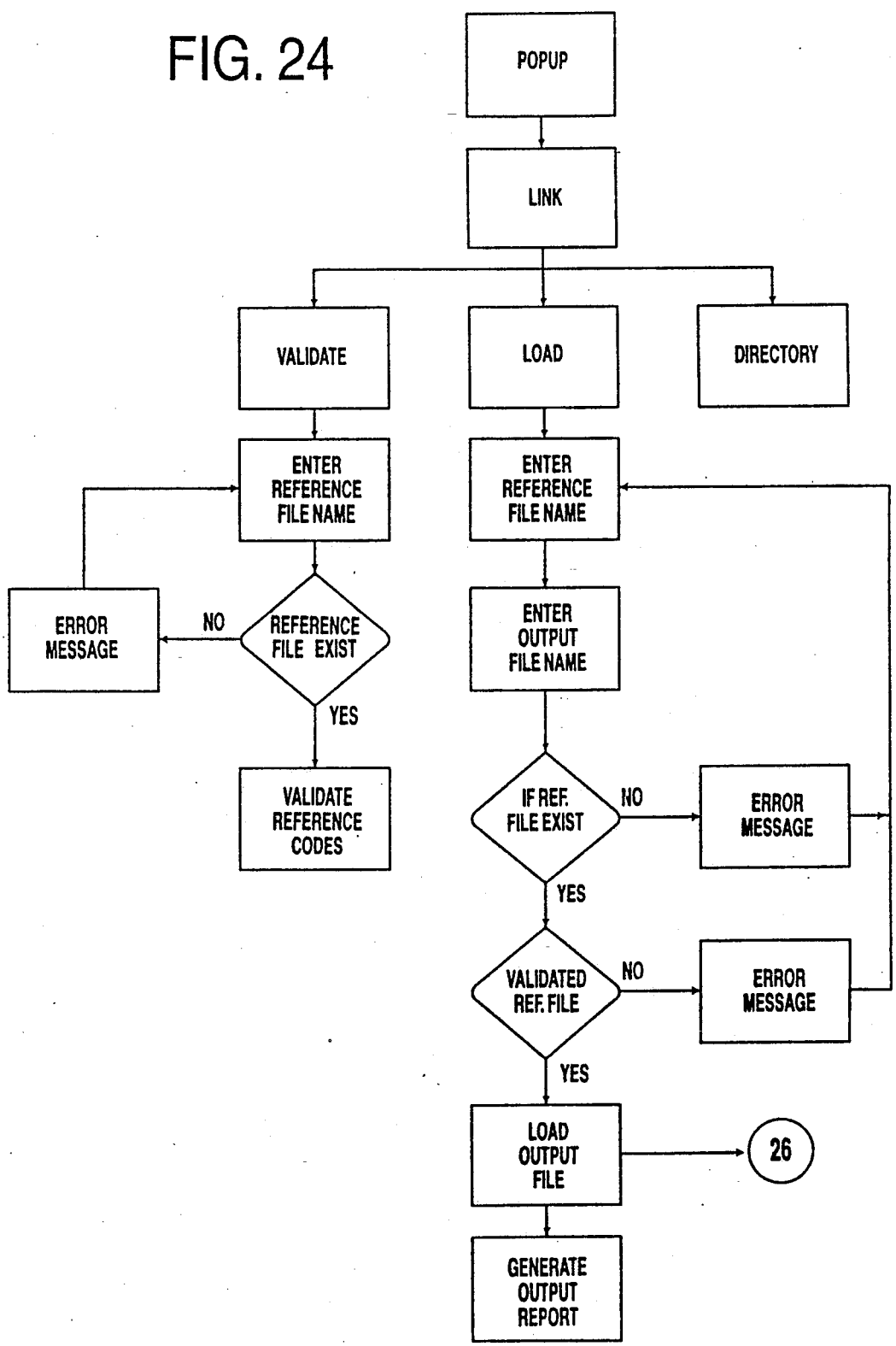
FIGS. 24-26 are flowcharts depicting the implementation of the Pop-up function of the present invention.

FIG. 24 illustrates the process involved using the Popup function. After Popup is invoked the LINK function allows the user to access software which is not part of the present invention. Such software includes, for example, electronic worksheets from LOTUS 1-2-3 ®. The system can then validate a worksheet to make sure all data referenced on it does exist. The system can also load a reference file with the requested information and extract data.

Figure 25:
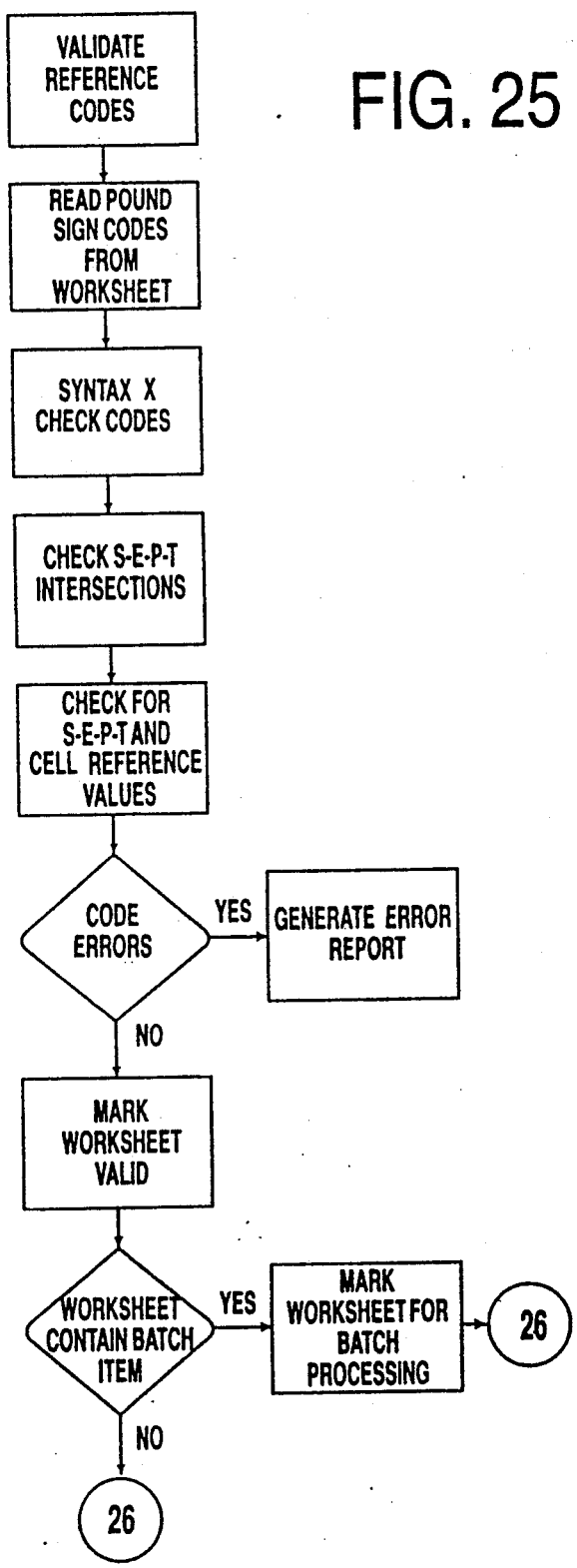

FIG. 25 illustrates the process involved in validating a reference file. The system reads the reference file cell by cell, checks for syntax errors, then checks to be sure that all SEPTS referenced exist. If no errors, the worksheet is marked valid and is ready to generate a report by extracting the requested information and loading it into the worksheet.

Figure 26:
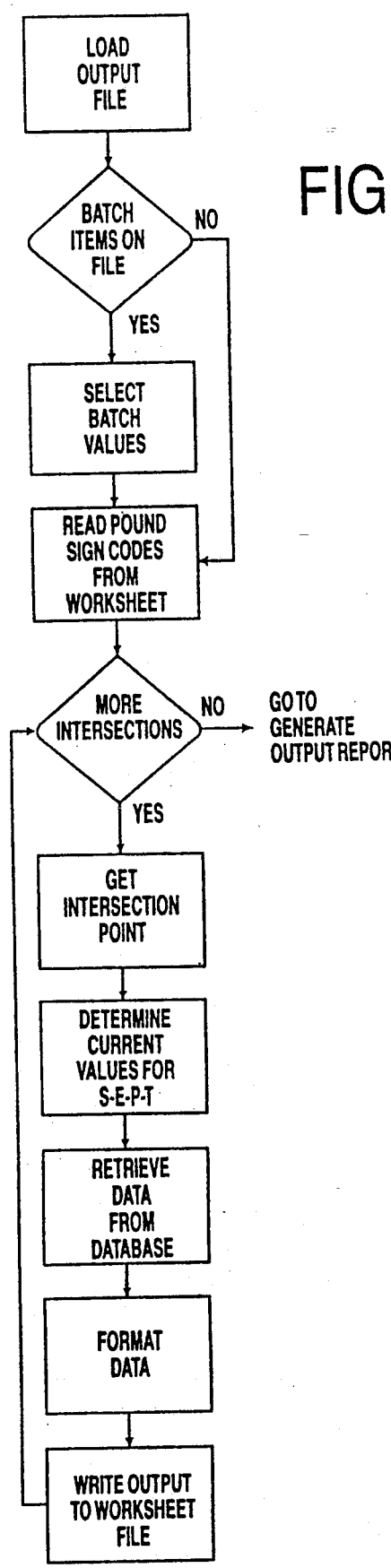

FIG. 26 illustrates the process of loading an output file. The extract codes (i.e. pound signs shown in column A of Table XV) are read cell by cell from the worksheet until the program reaches the end of file. From this data and the SEPT attributes specifying the column headings, the system determines what data values are to be loaded in each cell of the output file. It then goes into the data base, retrieves the requested data and writes it to the cell on the output file.

Thus it can be seen that there is provided a method and apparatus whereby advanced financial functions can be performed without the need for data manipulation or the restructuring of the data into a two dimensional table. In addition, it is to be understood that the invention can be carried out by specifically different equipment and devices and that various modifications, both as to equipment details and operating procedures can be effected without departing from the spirit and scope of the claimed invention.

What is claimed is:

1. In a computer, a method of storing and generating financial information of the type used in financial schedules comprising the steps of:

storing financial information in a first format in a storage means in which format each of a plurality of financial data values is associated with a set of at least three identifying attributes and some data values are associated with a set of attributes different from that associated with other data values;

specifying by user input to said computer a plurality of second formats in which are received data values to be stored in said storage means, each of said second formats associating each of a plurality of financial data value with one of said sets of at least three identifying attributes, whereby a plurality of user-defined data input templates are defined;

using said data input templates to convert data values received in each of the plurality of second formats into said first format and storing such data values in said storage means in said first format;

specifying by user input to said computer a plurality of third formats in which data values stored in said storage means are to be provided for output, each of said third formats associating a plurality of financial data values stored in said first format and associated with a first set of at least three attributes with a plurality of financial data values stored in said first format and associated with second set of at least three attributes, whereby a plurality of user-defined of data output templates are defined; and using one of said data output templates to convert data values stored in said storage means to said third format.

2. The method of claim 1 wherein the identifying attributes are a financial schedule in which the financial information appears, a business entity to which the financial information pertains, and a period of time to which the financial information pertains.

3. The method of claim 2 wherein the identifying attributes further include a fourth attribute defined by the user.

4. The method of claim 1 wherein said financial information is output by:
specifying a particular type of schedule,
specifying a combination of attributes such as entity, period and type;
specifying a number of rows and columns in which to display output data, and
specifying the locations of the attributes on the display of output data.

5. The method of claim 1 wherein input data may be stored in multiple schedules.

6. The method of claim 1 wherein integrity checks and currency conversions are performed at time of input.

7. Apparatus for the storage and generation of financial information of the type used in financial schedules comprising:

means for storing financial information in a first format in which format each of a plurality of financial data values is associated with a set of at least three identifying attributes and some data values are associated with a set of attributes different from that associated with other data values;

first means for specifying by user input to said apparatus a plurality of second formats in which are received data values to be stored in said storing means, each of said second formats associating each of a plurality of financial data values with one of said sets of at least three identifying attributes;

means for using said first specifying means to convert data values received in each of the plurality of second formats into said first format and for storing such data values in said storing means in said first format;

second means for specifying by user input to said apparatus a plurality of third formats in which data values stored in said storing means are to be provided for output, each of said third formats associating a plurality of financial data values stored in said first format and associated with a first set of at least three attributes with a plurality of financial data values stored in said first format and associated with a second set of at least three attributes; and means for using said second specifying means to convert data values stored in said storing means to said third format.

8. The apparatus of claim 7 wherein the identifying attributes are a financial schedule in which the financial information appears, a business entity to which the financial information pertains, and a period of time to which the financial information pertains.

9. The apparatus of claim 8 wherein the identifying attributes further include a fourth attribute defined by the user.

* * * * *